US012718177B2

(12) United States Patent
Miura et al.

(10) Patent No.: US 12,718,177 B2
(45) Date of Patent: Aug. 25, 2026

(54) OPERATION SEQUENCE IDENTIFICATION DEVICE, OPERATION SEQUENCE IDENTIFICATION SYSTEM, OPERATION SEQUENCE IDENTIFICATION METHOD, AND NON-TRANSITORY COMPUTER-READABLE RECORDING MEDIUM

(71) Applicant: Panasonic Intellectual Property Management Co., Ltd., Osaka (JP)

(72) Inventors: Koji Miura, Osaka (JP); Hidehiko Shin, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 22 days.

(21) Appl. No.: 18/751,674

(22) Filed: Jun. 24, 2024

(65) Prior Publication Data

US 2024/0346426 A1 Oct. 17, 2024

Related U.S. Application Data

(63) Continuation of application No. 17/128,839, filed on Dec. 21, 2020, now Pat. No. 12,056,648, which is a (Continued)

(30) Foreign Application Priority Data

Jul. 18, 2018 (JP) ................................ 2018-135355

(51) Int. Cl.
*G06Q 10/0639* (2023.01)
*G06Q 20/20* (2012.01)
(Continued)

(52) U.S. Cl.
CPC ..... *G06Q 10/06398* (2013.01); *G06Q 20/203* (2013.01); *G06V 10/764* (2022.01);
(Continued)

(58) Field of Classification Search
CPC ........... G06Q 10/06398; G06Q 20/203; G06V 10/764; G06V 10/82; G06V 20/36;
(Continued)

(56) References Cited

U.S. PATENT DOCUMENTS

2013/0204675 A1 8/2013 Dobell
2014/0080511 A1 3/2014 Saitoh
(Continued)

FOREIGN PATENT DOCUMENTS

CA 2 796 065 10/2011
JP 04-046749 A 2/1992
(Continued)

OTHER PUBLICATIONS

Decision of Rejection issued Aug. 19, 2024 in corresponding Chinese Application No. 201980040731.X, with machine translation, 44 pages.

(Continued)

*Primary Examiner* — Delomia L Gilliard
(74) *Attorney, Agent, or Firm* — Wenderoth, Lind & Ponack, L.L.P.

(57) ABSTRACT

The operation sequence identification device identifies an operation sequence including a series of individual operations. The operation sequence identification device includes an communication circuit that acquires first sensing information indicating the position of a moving object in an operation area in chronological order and plural pieces of second sensing information indicating surrounding environment states at different positions in the operation area in chronological order, and a control circuit that specifies the
(Continued)

order of the series of individual operations based on the first sensing information and that identifies the operation content of each of the series of individual operations based on the second sensing information.

10 Claims, 16 Drawing Sheets

Related U.S. Application Data continuation of application No. PCT/JP2019/020958, filed on May 27, 2019.

(51) Int. Cl.

| | |
|---|---|
| ***G06V 10/764*** | (2022.01) |
| ***G06V 10/82*** | (2022.01) |
| ***G06V 20/00*** | (2022.01) |
| ***G06V 20/52*** | (2022.01) |
| ***H04W 4/029*** | (2018.01) |
| ***H04W 4/33*** | (2018.01) |
| ***H04W 4/38*** | (2018.01) |

(52) U.S. Cl.

CPC .............. *G06V 10/82* (2022.01); *G06V 20/36* (2022.01); *G06V 20/52* (2022.01); *H04W 4/029* (2018.02); *H04W 4/33* (2018.02); *H04W 4/38* (2018.02)

(58) Field of Classification Search

CPC ........ G06V 20/52; H04W 4/029; H04W 4/33; H04W 4/38; H04L 67/12

See application file for complete search history.

(56) References Cited

U.S. PATENT DOCUMENTS

| | | | | |
|---|---|---|---|---|
| 2015/0310615 | A1* | 10/2015 | Bulan | G06T 7/74<br>348/143 |
| 2016/0212266 | A1* | 7/2016 | Soundar | H04M 3/523 |
| 2016/0379245 | A1* | 12/2016 | Dey | G06Q 30/0246<br>705/14.45 |
| 2018/0018508 | A1* | 1/2018 | Tusch | G06V 20/52 |
| 2018/0285767 | A1* | 10/2018 | Chew | G06N 20/00 |
| 2018/0293442 | A1* | 10/2018 | Fridental | G06V 10/776 |
| 2018/0350144 | A1* | 12/2018 | Rathod | G06Q 20/3224 |
| 2019/0043003 | A1* | 2/2019 | Fisher | G06V 10/82 |
| 2021/0042724 | A1* | 2/2021 | Rathod | G07G 1/0054 |

FOREIGN PATENT DOCUMENTS

| | | | | |
|---|---|---|---|---|
| JP | 2007-234058 | | | 9/2007 |
| JP | 2011-242924 | A | | 12/2011 |
| JP | 2012-150613 | | | 8/2012 |
| JP | 2012-173789 | | | 9/2012 |
| JP | 5087153 | | | 11/2012 |
| JP | 2013-238973 | A | | 11/2013 |
| JP | 2014106628 | A | * | 6/2014 |
| JP | 2016058074 | A | * | 4/2016 |
| JP | 6318506 | | | 5/2018 |
| KR | 20200019955 | A | * | 2/2020 |

OTHER PUBLICATIONS

International Search Report issued Jul. 23, 2019 in International (PCT) Application No. PCT/JP2019/020958 with English translation.

English Translation of the International Preliminary Report on Patentability mailed Jan. 28, 2021 in International Application No. PCT/JP2019/020958.

Extended European Search Report issued Aug. 6, 2021 in corresponding European Patent Application No. 19838661.7.

Communication pursuant to Article 94(3) EPC issued Mar. 22, 2023 in corresponding European Patent Application No. 19838661.7.

Yuanyuan Cao et al., "An Event-driven Context Model in Elderly Health Monitoring", Symposia and Workshops on Ubiquitous, Autonomic and Trusted Computing, pp. 120-124, Jul. 2009.

Carlos Fernando Crispim-Junior et al., "A Multi-Sensor Approach for Activity Recognition in Older Patients", Second International Conference on Ambient Computing, Applications, Services and Technologies—AMBIENT 2012, IARIA, Sep. 2012, Barcelona, Spain.

Notice of Reasons for Refusal issued Jun. 20, 2023 in corresponding Japanese Patent Application No. 2020-530917, with machine translation, 7 pages.

Notice of Reasons for Refusal issued Oct. 31, 2023 in corresponding Japanese Application No. 2020-530917, with machine translation, 7 pages.

Office Action issued Dec. 1, 2023 in corresponding Chinese Application No. 201980040731.X, with Machine translation, 23 pages.

Second Office Action issued May 15, 2024 in corresponding Chinese Application No. 201980040731.X, with machine translation, 24 pages.

Notice of Reasons for Refusal issued Oct. 28, 2025 in corresponding Japanese Application No. 2024-075940, with machine translation, 8 pages.

Official Communication dated Feb. 2, 2026 in corresponding European Patent Application No. 19838661.7, 5 pages.

* cited by examiner

51

| ID OF VICINITY SENSOR | COORDINATE (x) | COORDINATE (y) | SENSITIVITY (r) |
|---|---|---|---|
| S1 | 115 | 24 | 4 |
| S2 | 57 | 60 | 4 |
| ⋮ | ⋮ | ⋮ | ⋮ |

| OPERATION SITE | x1 | y1 | x2 | y2 |
| --- | --- | --- | --- | --- |
| L1 | 120 | 20 | 128 | 28 |
| L2 | 120 | 29 | 124 | 40 |
| ⋮ | ⋮ | ⋮ | ⋮ | ⋮ |

| OPERATION SITE | OPERATION TIPE A | OPERATION TIPE B | OPERATION TIPE C |
| --- | --- | --- | --- |
| STARTING POSITION | L2 | L1 | L5 |
| ENDING POSITION | L2 | L4 | L9 |

| MOVEMENT LINE | | |
|---|---|---|
| TIME | x | y |
| 00:00:00 | 128 | 23 |
| 00:00:01 | 129 | 24 |
| ⋮ | ⋮ | ⋮ |

| SURROUNDING ENVIRONMENT | | | | |
|---|---|---|---|---|
| TIME | d1 | d2 | ··· | dn |
| 00:00:00 | 6897 | 127 | ··· | 354 |
| 00:00:01 | 6800 | 276 | ··· | 451 |
| ⋮ | ⋮ | ⋮ | ⋮ | ⋮ |

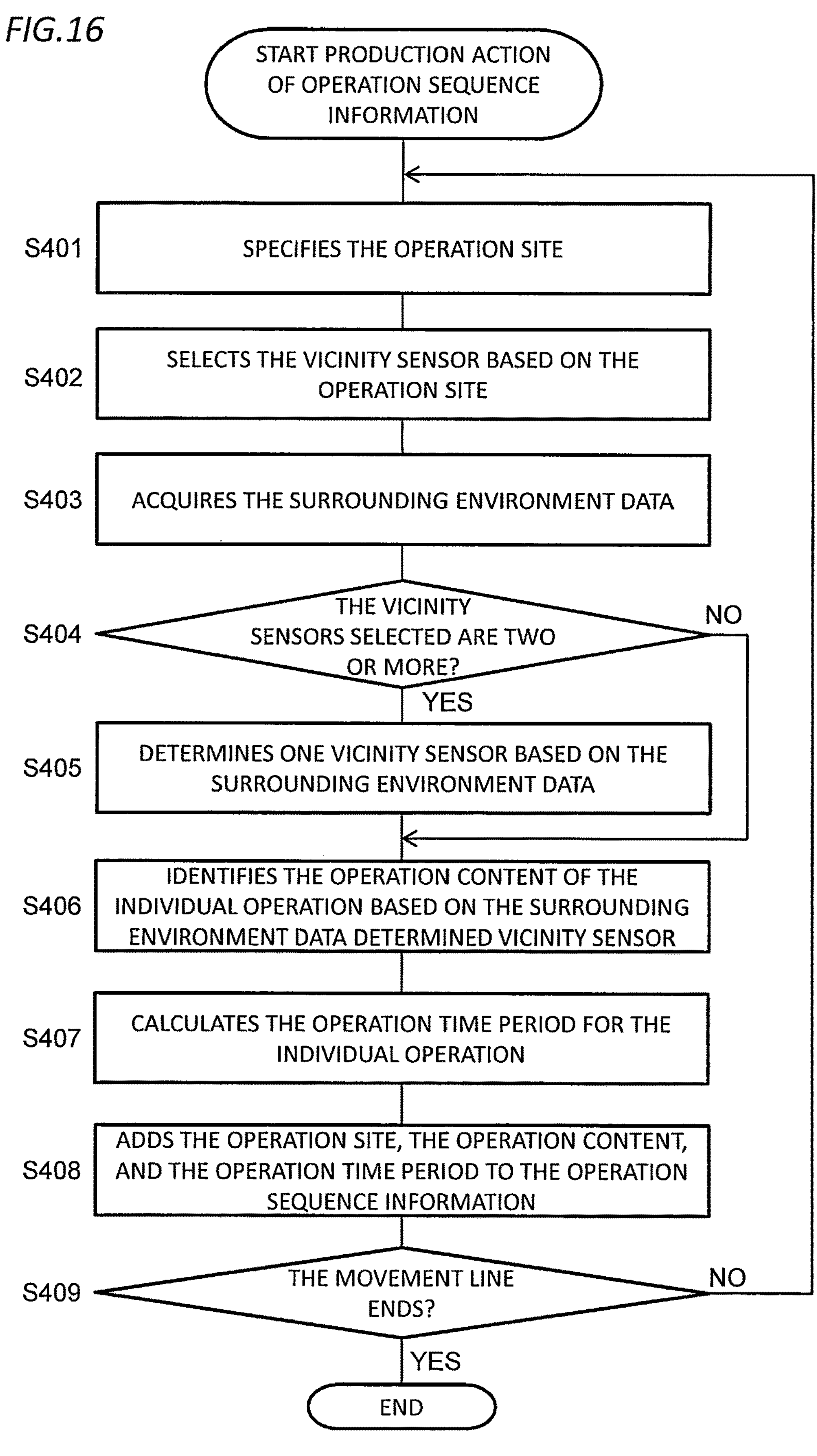
FIG.16
START PRODUCTION ACTION OF OPERATION SEQUENCE INFORMATION
S401
SPECIFIES THE OPERATION SITE
S402
SELECTS THE VICINITY SENSOR BASED ON THE OPERATION SITE
S403
ACQUIRES THE SURROUNDING ENVIRONMENT DATA
S404
THE VICINITY SENSORS SELECTED ARE TWO OR MORE?
NO
YES
S405
DETERMINES ONE VICINITY SENSOR BASED ON THE SURROUNDING ENVIRONMENT DATA
S406
IDENTIFIES THE OPERATION CONTENT OF THE INDIVIDUAL OPERATION BASED ON THE SURROUNDING ENVIRONMENT DATA DETERMINED VICINITY SENSOR
S407
CALCULATES THE OPERATION TIME PERIOD FOR THE INDIVIDUAL OPERATION
S408
ADDS THE OPERATION SITE, THE OPERATION CONTENT, AND THE OPERATION TIME PERIOD TO THE OPERATION SEQUENCE INFORMATION
S409
THE MOVEMENT LINE ENDS?
NO
YES
END

OPERATION SEQUENCE IDENTIFICATION DEVICE, OPERATION SEQUENCE IDENTIFICATION SYSTEM, OPERATION SEQUENCE IDENTIFICATION METHOD, AND NON-TRANSITORY COMPUTER-READABLE RECORDING MEDIUM

CROSS-REFERENCE TO RELATED APPLICATIONS

This is a continuation application of U.S. patent application Ser. No. 17/128,839, filed Dec. 21, 2020, which is a continuation application of International Application No. PCT/JP2019/020958, with an international filing date of May 27, 2019, which claims priority of Japanese Patent Application No. 2018-135355 filed on Jul. 18, 2018, each of the content of which is incorporated herein by reference.

TECHNICAL FIELD

This disclosure relates to an operation sequence identification device, an operation sequence identification system, an operation sequence identification method, and a computer program that each identifies an operation sequence.

BACKGROUND ART

Japanese Patent No. 5087153 discloses a behavior state estimation system. The behavior state estimation system estimates the behavior state of a person from use information on an instrument in a building, sensor information detected by a sensor in the building, and arrangement relation information on a room of the building, the instrument, and the sensor. Even in the case where plural persons are present in the building, the behavior state of each of users can thereby be specified without using any camera and calculation of the power consumption by each of the users is enabled.

Japanese Patent No. 6318506 discloses a movement line management system. The movement line management system estimates a movement line starting date and time of a manipulation content for an instrument such as a copying manipulation or a printing manipulation based on use information on the instrument and position information on a radio terminal held by a user. Determination of an appropriate movement line for the user using the instrument is thereby enabled.

SUMMARY

This disclosure provide an operation sequence identification device, an operation sequence identification system, an operation sequence identification method, and a computer program stored on a non-transitory computer-readable recording medium each highly precisely identifying an operation sequence that includes a series of individual operations executed by a moving object.

In one general aspect, the operation sequence identification device of this disclosure is an operation sequence identification device identifying an operation sequence that includes a series of individual operations, and includes an acquire unit that acquires first sensing information indicating the position of a moving object in an operation area in chronological order and plural pieces of second sensing information indicating surrounding environment states at different positions in the operation area in chronological order, and a control unit that specifies the order of the series of individual operations based on the first sensing information and that identifies the operation content of each of the series of individual operations based on the second sensing information.

These general and specific aspects may each be realized by a system, a method, a computer program, or a combination thereof.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to the operation sequence identification device of the above general aspect, the operation sequence identification system, the operation sequence identification method, and the computer program of this disclosure, the operation sequence including a series of individual operations executed by a moving object can highly precisely be identified based on the plural pieces of sensing information. The plural pieces of sensing information include first sensing information that indicates the position of the moving object in an operation area in chronological order and plural pieces of second sensing information that indicate surrounding environment states at different positions in the operation area in chronological order. According to the operation sequence identification device, the operation sequence identification system, the operation sequence identification method, and the program of this disclosure, the order of the series of individual operations is determined based on the first sensing information and the operation content of the individual operation is identified based on the second sensing information. The operation sequence can thereby be highly precisely identified.

BRIEF DESCRIPTION OF DRAWINGS

FIG. 6 is an example of segmentation information indicating the ranges of operation sites.

FIG. 7 is an example of start and end information indicating the starting position and the ending position of the operation for each of operation types.

FIG. 8 is an example of movement line data acquired from video image data of the camera.

FIG. 9 is an example of surrounding environment data produced by the vicinity sensor.

FIG. 16 is a flowchart depicting the details of an operation sequence information production process (step S4) in FIG. 15.

DETAILED DESCRIPTION

Finding to be Basis of this Disclosure

To make a review of operations each taking a long time, an operation efficiency improvement for the dispersion of the time period needed by each of employees, and the like at a practical operation site at which the employees work such as a kitchen or a plant, a person in charge of improvements has traditionally intervened and measured the time period necessary for each individual operation in an operation sequence including a series of individual operations. For example, in the eating-out industry and the like, in the case where an efficiency improvement of cooking operations in a kitchen is facilitated, the person in charge of improvements arranges cameras in the kitchen, refers to the camera video images and the like, and thereby identifies the operation content of each of the individual operations in the operation sequence from reception of an order to service of the dish and measures the time period necessary for each of the individual operations using a stopwatch or the like.

A CPS (Cyber Physical System) that reproduces and analyzes in a virtual space a process that is present in a practical site space and that proposes an improvement idea to the practical site has recently been about to be introduced. In the introduction of the CPS, to efficiently measure the operation time period, for example, automatization of the calculation of the operation time period is demanded. To do this, identification only by instruments without any intervention of a person is desired for an operation sequence performed by an employee.

This embodiment provides an operation sequence identification device that highly precisely identifies an operational sequence including a series of individual operations executed by a moving object such as a person. For example, the operation sequence identification device identifies the operation sequence based on wide area sensing information produced by a remote sensor such as a camera and vicinity sensing information produced by a vicinity sensor that detects a vibration, an electromagnetic wave, and the like.

First Embodiment

In this embodiment, an example will be described where an operation sequence including a series of individual operations is identified in the case where the moving object is a person and the series of individual operations performed by the person is operations in a kitchen. The series of individual operations in the kitchen includes plural individual operations, for example, from reception of an order to service of the dish. The plural individual operations are, for example, reception of an order, opening and closing of a refrigerator, opening and closing of a cupboard, setting-out of foodstuff, and service of the dish.

1. Configuration of Operation Sequence Identification System

Figure 1:
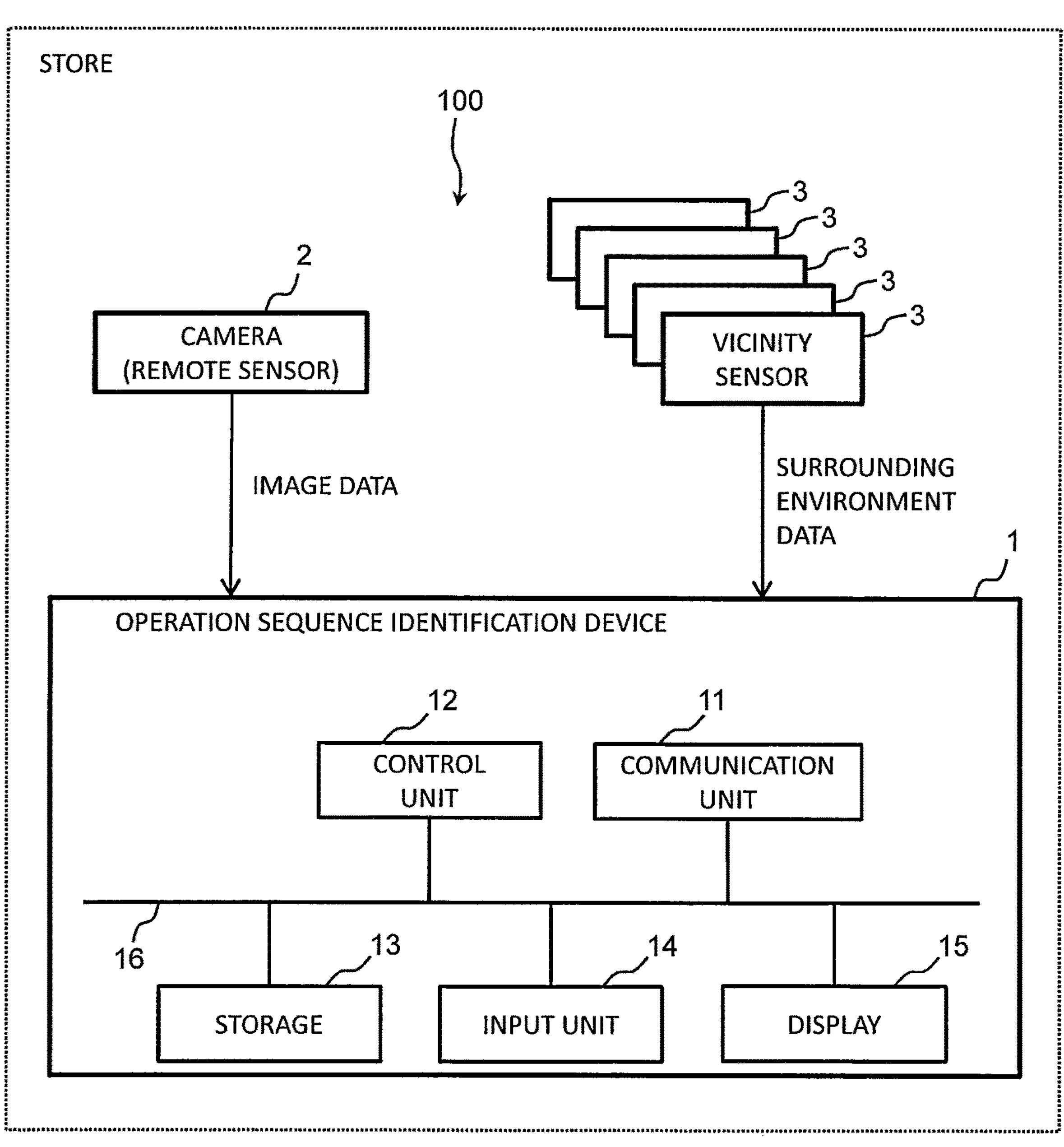
FIG. 1 is a block diagram depicting the configuration of an operation sequence identification system of a first embodiment.

FIG. 1 depicts the electric configuration of an operation sequence identification system 100 of this embodiment. The operation sequence identification system 100 includes an operation sequence identification device 1, a camera 2, and plural vicinity sensors 3. In this embodiment, the operation sequence identification device 1, the camera 2, and the plural vicinity sensors 3 are disposed in a store that provides meals. The operation sequence identification device 1 and the camera 2 are connected to each other by, for example, a wire. The operation sequence identification device 1 is connected to the plural vicinity sensors 3 through, for example, a radio router. The operation sequence identification device 1 identifies the operation sequence including the series of individual operations performed by an employee in the kitchen based on video image data produced by the camera 2 and surrounding environment data produced by the plural vicinity sensors 3.

1.1 Configuration of Operation Sequence Identification Device

The operation sequence identification device 1 is, for example, one of various information processing devices such as a personal computer or a tablet terminal that is disposed in the store. The operation sequence identification device 1 includes a communication unit 11, a control unit 12, a storage 13, an input unit 14, a display 15, and a bus 16.

The communication unit 11 includes a communication circuit that executes communication with external instruments being compliant with a predetermined communication standard. The predetermined communication standard is, for example, a LAN, Wi-Fi (a registered trademark), Bluetooth (a registered trademark), USB, or HDMI (a registered trademark). The communication unit 11 acquires the video image data from the camera 2 and acquires the surrounding environment data from each of the plural vicinity sensors 3.

The control unit 12 can be realized using a semiconductor element or the like. The control unit 12 is a control circuit, for example, a microcomputer, a CPU, an MPU, a GPU, a DSP, an FPGA, or an ASIC. The functions of the control unit 12 may be configured using hardware alone or may be realized by combining hardware and software with each other. The control unit 12 reads data and computer programs stored in the storage 13, executes various types of computing process, and thereby realizes predetermined functions.

The storage 13 is a storage medium having computer programs and data stored therein that are necessary for realizing the functions of the operation sequence identification device 1. The storage 13 can be realized using, for example, an HDD (a hard disc), an SSD, a RAM, a DRAM, a ferroelectric memory, a flash memory, a magnetic disc, or a combination thereof.

The communication unit 11 corresponds to an acquire unit that acquires the video image data and the pieces of surrounding environment data respectively from the camera 2 and the vicinity sensors 3. The video image data and the pieces of surrounding environment data acquired through the communication unit 11 are stored in the storage 13. The control unit 12 corresponds to an acquire unit that reads the video image data and the pieces of surrounding environment data stored in the storage 13.

The input unit 14 is a user interface into which various types of manipulations by a user are input. The input unit 14 can be realized using a touch panel, a keyboard, a button, a switch, or a combination thereof.

The display 15 is, for example, a liquid crystal display or an organic EL display. The display 15 displays thereon the operation sequence identified by the control unit 12.

The bus 16 is a signal line electrically connecting the communication unit 11, the control unit 12, the storage 13, the input unit 14, and the display 15 to each other.

1.2 Configuration of Camera

Figure 2:
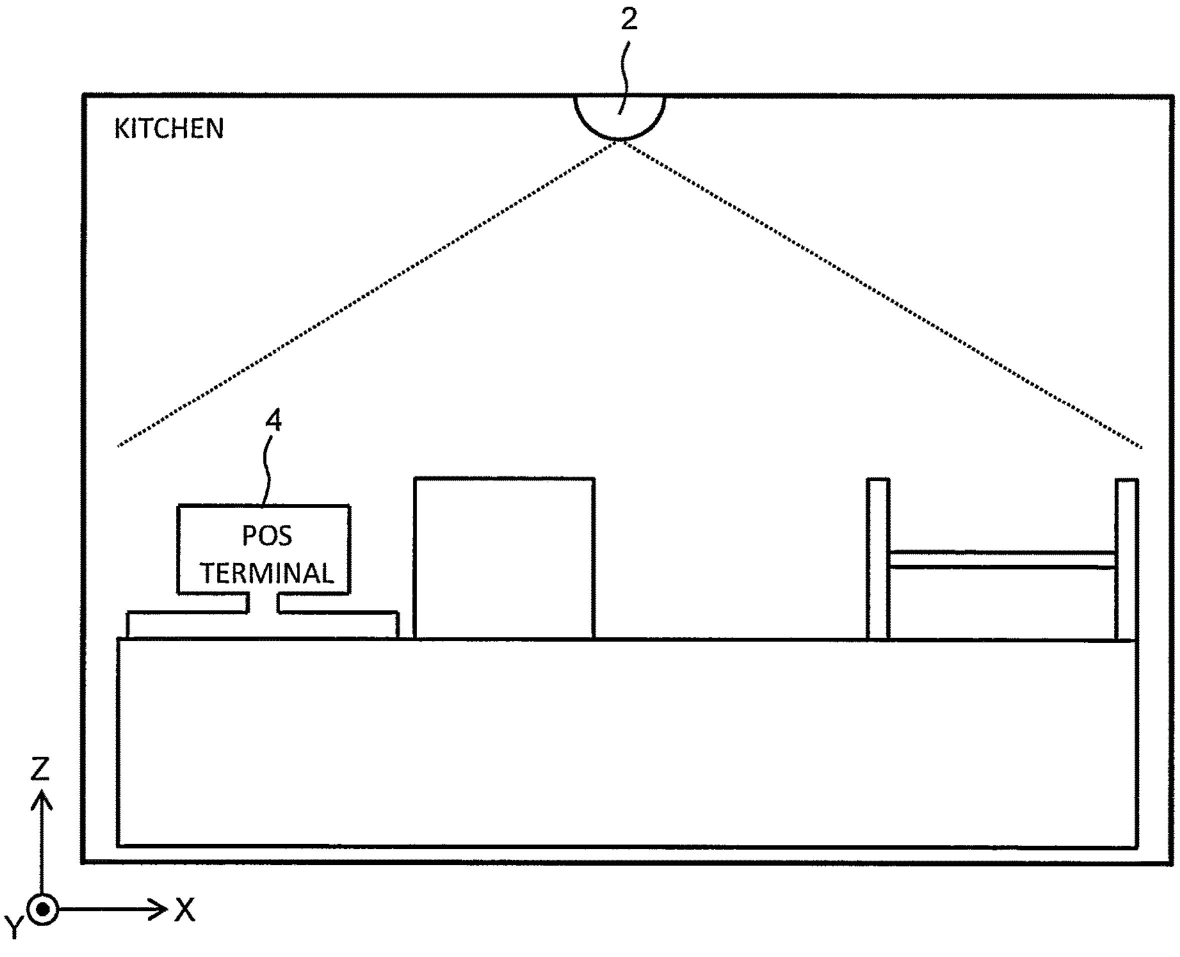
FIG. 2 is a diagram for explaining the position of a camera.

FIG. 2 depicts an example of the position at which the camera 2 is disposed. The camera 2 is, for example, an all-around camera disposed on the ceiling of the kitchen of the store. The camera 2 includes an image sensor such as a CCD image sensor, a CMOS image sensor, or an NMOS image sensor. The camera 2 shoots the inside of the kitchen and produces the video image data. The camera 2 is an example of the remote sensor that detects the position of the moving object in an operation area. The video image data produced by the camera 2 is an example of first sensing information, that is, the wide area sensing information that indicates the position of the moving object in the operation area in chronological order. The video image data includes time-of-day information that indicates the shooting time of day.

1.3 Configuration of Vicinity Sensor

Figure 3:
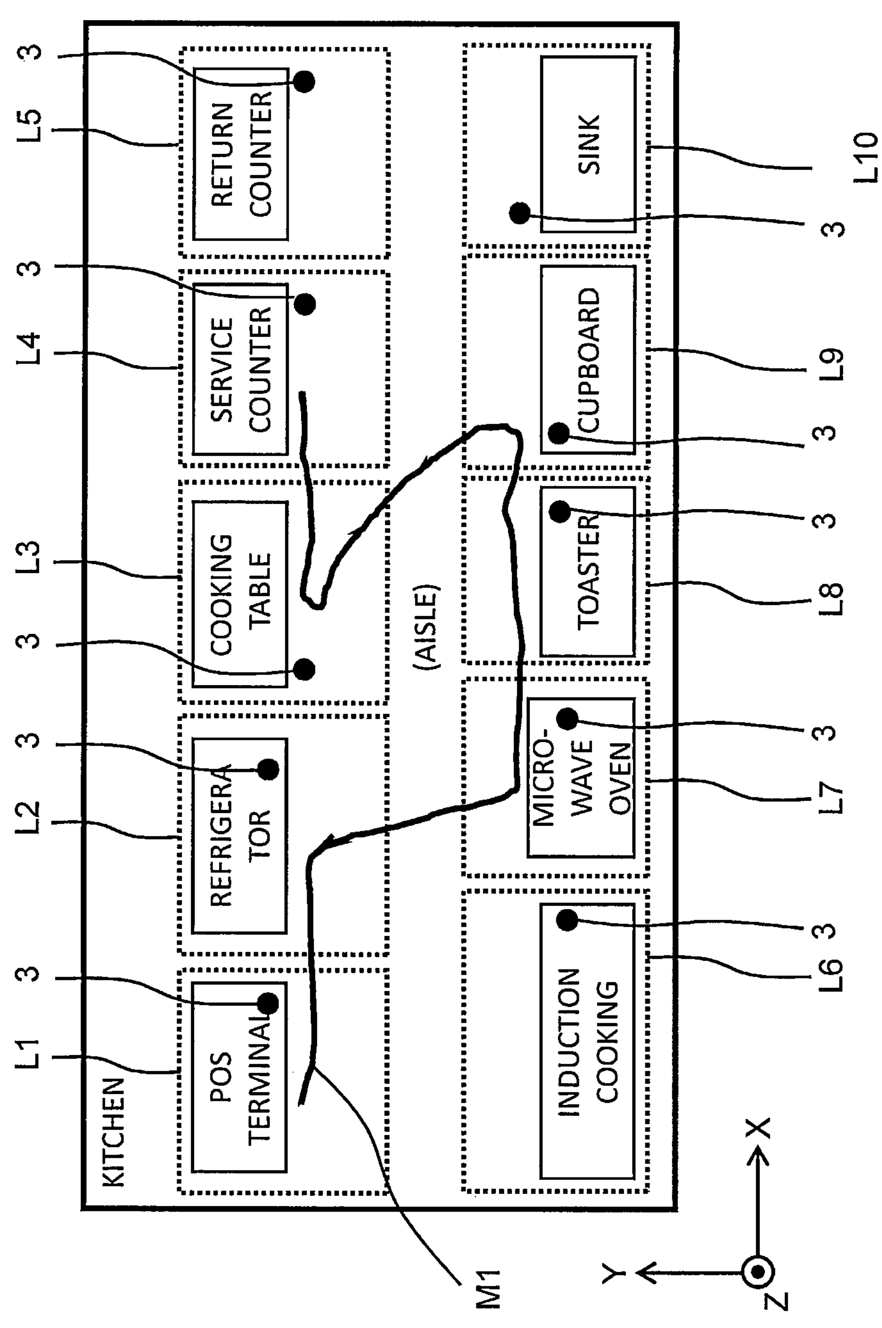
FIG. 3 is a diagram for explaining the positions of vicinity sensors.

FIG. 3 depicts an example of the positions at which the plural vicinity sensors 3 are arranged. The plural vicinity cameras 3 are arranged at positions different from each other in the kitchen. The control unit 12 segments the inside of the kitchen into plural operation sites that are, in the example in FIG. 3, operation sites L1 to L10 to manage the inside thereof. The shape of each of the operation sites in the example in FIG. 3 is a rectangle while the manner of segmentation of the operation sites is optional and the shape does not need to be a rectangle. The number of the segmented operation sites may properly be determined in accordance with the size of the overall operation area. Each of the vicinity sensors 3 is disposed at any of the plural operation sites L1 to L10. Each of the vicinity sensors 3 is disposed, for example, on the door or in the inside of a refrigerator, on the door or in the inside of a cupboard, in the vicinity of a microwave oven, or in the vicinity of a service counter. When the operation sites L1 to L10 are each not especially distinguished from each other herein, the operation sites are collectively referred to as "operation site L". The plural vicinity sensors 3 each detect the surrounding environment state of the position at which the vicinity sensor 3 is disposed and each produce the surrounding environment data that indicates the surrounding environment state in chronological order. The surrounding environment data is an example of second sensing information, that is, the vicinity sensing information that indicates the surrounding environment states at the positions different from each other in the operation area in chronological order.

Figures 4, 5:
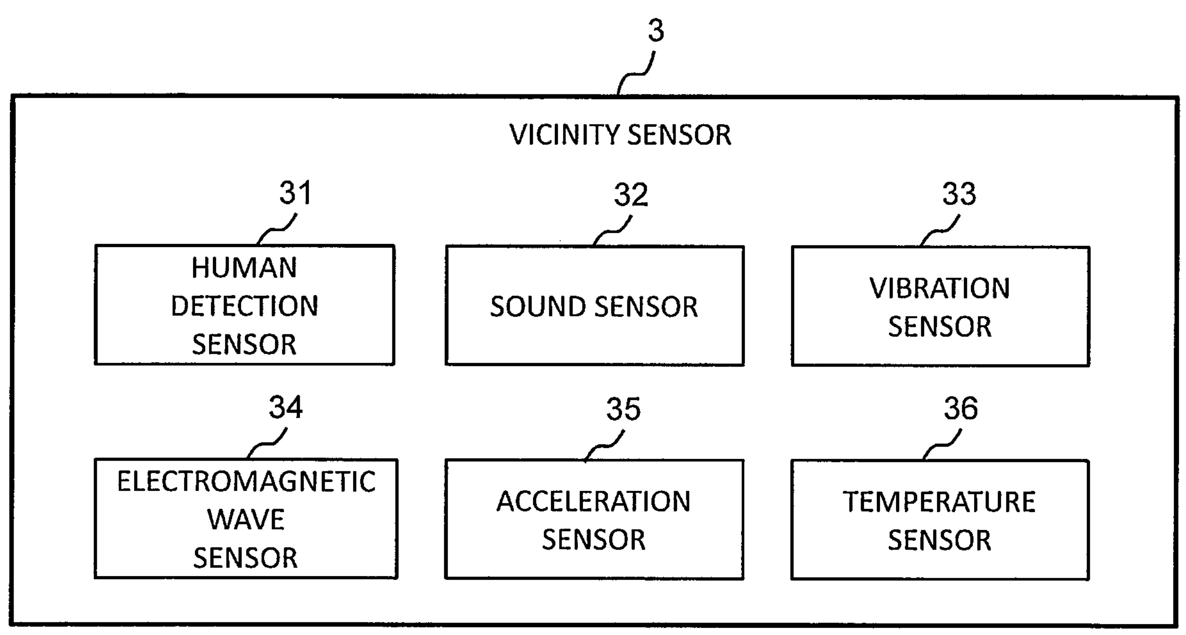
FIG. 4 is a diagram for explaining the types of the sensors included in the vicinity sensor.
FIG. 5 is an example of sensor position information indicating the positions of the vicinity sensors.

FIG. 4 depicts an example of the types of the sensors included in each of the vicinity sensors 3. The vicinity sensor 3 in this embodiment is a multi-modal sensor having plural sensors packaged therein as one instrument. For example, each of the vicinity sensors 3 includes two or more of a human detection sensor 31, a sound sensor 32, a vibration sensor 33, an electromagnetic wave sensor 34, an acceleration sensor 35, and a temperature sensor 36 or all thereof in this embodiment, in one housing. The vicinity sensor 3 may include any one or more of a geomagnetic sensor, a humidity sensor, an illuminance sensor, and an atmospheric pressure sensor. The vicinity sensor 3 may have only one sensor packaged therein.

2. Data and Like Used in Operation Sequence Identification System

FIG. 5 is an example of sensor position information indicating the position and the sensitivity of each of the plural vicinity sensors 3. The sensor position information 51 is stored in advance in, for example, the storage 13. The sensor position information 51 includes an ID to be identification information on the vicinity sensor 3 and values of the x- and the y-coordinates that represent the position of the vicinity sensor 3. The sensor position information 51 further includes the value of the radius r centering the vicinity sensor 3 that represents the sensitivity of the vicinity sensor 3.

FIG. 6 is an example of segmentation information indicating the positions of the operation sites L. The segmentation information 52 is stored in advance in, for example, the storage 13. In this embodiment, as depicted in FIG. 3, the area in the kitchen is segmented into the plural operation sites L each having a rectangular shape and the segmentation information 52 therefore includes values x1, y1, x2, and y2 of the x- and the y-coordinates of the diagonal positions that represent the range of each of the operation sites L.

FIG. 7 is an example of start and end information indicating the starting position and the ending position for each of the operation types. The start and end information 53 is stored in advance in, for example, the storage 13. The operation types A, B, and Care, for example, a food preparation step executed during the preparation for opening the store, a cooking step executed during the business hours, and a clearing step executed during the preparation for closing the store. The starting position and the ending position are each represented by any of the operation sites L1 to L10. The starting position and the ending position may each be indicated by an x- and a y-coordinates in the kitchen instead of the operation sites L1 to L10.

FIG. 8 is an example of movement line data. The control unit 12 of the operation sequence identification device 1 identifies a moving object such as a person from the video image data of the camera 2 by an image analysis, and produces the movement line data 54 indicating the position of the moving object. In the case where plural persons are shown at the same time of day in the video image data, the control unit 12 produces the movement line data 54 for, for example, each of the persons. The movement line data 54 indicates, for example, a movement line M1 as depicted in FIG. 3. For example, the movement line data 54 in this embodiment indicates the position of the person at each time of day using an x- and a y-coordinates.

FIG. 9 is an example of surrounding environment data produced by each of the vicinity sensors 3. The surrounding environment data 55 includes detected values d1 to dn at each of the times of day. The detected values d1 to dn are values detected by the human detection sensor 31, the sound sensor 32, the vibration sensor 33, the electromagnetic wave sensor 34, the acceleration sensor 35, and the temperature sensor 36. The detected values d1 to dn each correspond to any of an infrared ray, a sound, a vibration, an electromagnetic wave, an acceleration, and a temperature. The surrounding environment data 55 may include detected values of geomagnetism, humidity, illuminance, and an atmospheric pressure in accordance with the types of the sensors included in the vicinity sensor 3.

Figure 10:
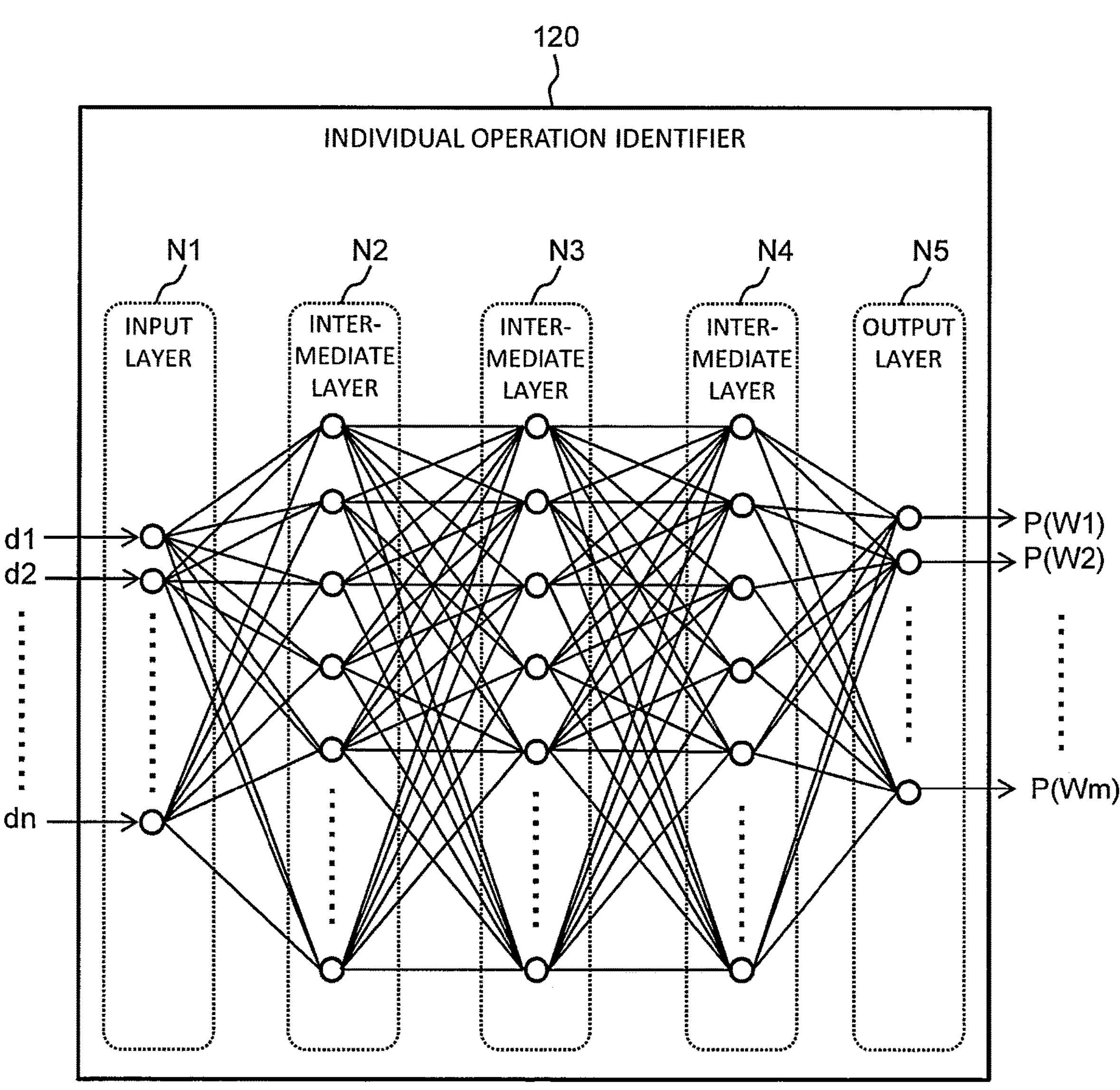
FIG. 10 is a diagram for explaining an example of identification of the operation content of an individual operation in the first embodiment.

FIG. 10 depicts an example of an identification method for the operation content of an individual operation. The control unit 12 identifies the operation content of the individual operation using an individual operation identifier 120. The program and the parameters constructing the individual operation identifier 120 are stored in, for example, the storage 13.

The individual operation identifier 120 includes a model learned using machine learning such as deep learning such that the operation content of each of the individual operations is identified. For example, the individual operation identifier 120 includes a recurrent neural network. The recurrent neural network has a multi-layer structure including, for example, an input layer N1, intermediate layers N2, N3, and N4, and an output layer N5. The number of the intermediate layers is not limited to three layers. The intermediate layers includes one or more layers. The individual operation identifier 120 may employ another type of machine learning algorism.

For example, when the detected values d1 to dn for a predetermined time period of the surrounding environment data 55 are input from the input layer N1, the individual operation identifier 120 outputs probabilities P(W1) to P(Wm) each indicating which operation content is represented, from the output layer N5. The predetermined time period is, for example, 10 seconds. For example, for the cooking step, the operation contents W1 to Wm correspond to reception of an order, opening or closing of a refrigerator, opening or closing of a cupboard, use of a microwave oven, setting-out, service of the dish, and the like. When the operation contents W1 to Wm are not especially distinguished from each other herein, the operation contents W1 to W10 are collectively referred to as "operation content W".

The recurrent neural network is learned based on teacher data having the surrounding environment data for learning and a correct answer label showing the operation content corresponding to the surrounding environment data for learning, correlated therein in advance with each other. A weighting coefficient of each of the layers of the recurrent neural network included in the individual operation identifier 120 is set based on the learning that uses the teacher data. For example, the weighting coefficient between nodes of each of the layers is set such that the probability corresponding to the operation content of the correct answer label is the highest of the probabilities P(W1) to P(Wm) acquired by inputting the detected values d1 to dn for 10 seconds into the individual operation identifier 120. The learning of the individual operation identifier 120 may be executed by the operation sequence identification device 1 or may be executed by another information processing device.

When the control unit 12 identifies the operation content from the surrounding environment data 55, the control unit 12 calculates the probabilities P(W1) to P(Wm) of the operation content by inputting the detected values d1 to dn for the predetermined time period into the individual operation identifier 120 already finishing the learning. The control unit 12 determines, for example, that the operation content indicated by the detected values d1 to dn for the predetermined time period input into the input layer N1 is the operation content having the greatest value of those of the probabilities P(W1) to P(Wm) acquired from the output layer N5.

Figure 11:
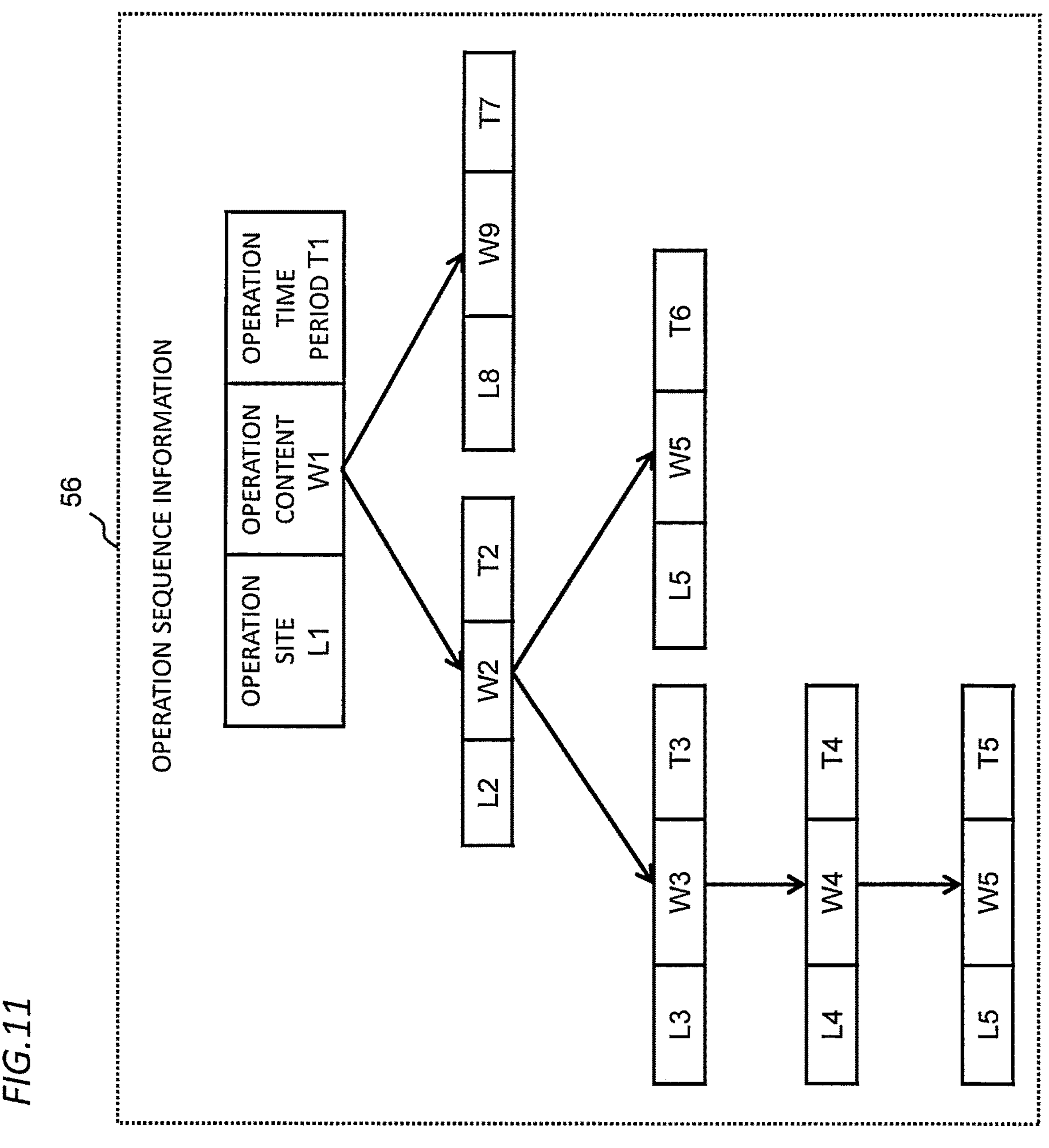
FIG. 11 is a diagram for explaining an example of operation sequence information.

FIG. 11 is a diagram schematically depicting an example of operation sequence information produced by the control unit 12. The operation sequence information 56 indicates a graph showing in chronological order information including, for example, the operation site, the operation content, and the operation time period. The operation site L described in the operation sequence information 56 is any of the operation sites L1 to L10 depicted in FIG. 3. The operation content W described in the operation sequence information 56 is the result of the identification executed using the individual operation identifier 120 depicted in FIG. 10, and is any of the operation contents W1 to Wm. The operation time period T described in the operation sequence information 56 represents the time periods T1, T2, and so on during which the individual operations of the operation content W are executed at the operation site L.

Figure 12:
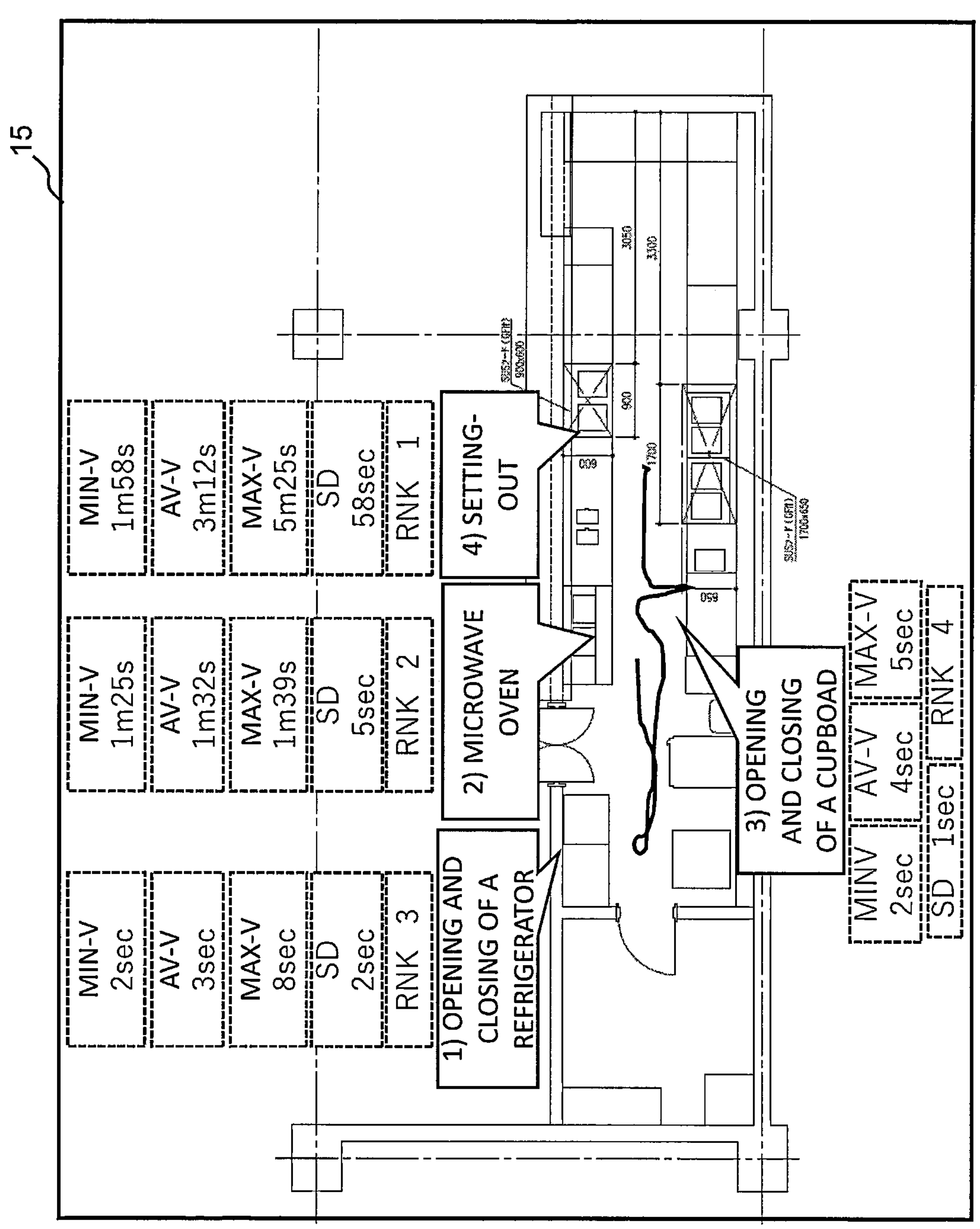
FIG. 12 is a diagram depicting an example of display of an operation sequence.
Figure 13:
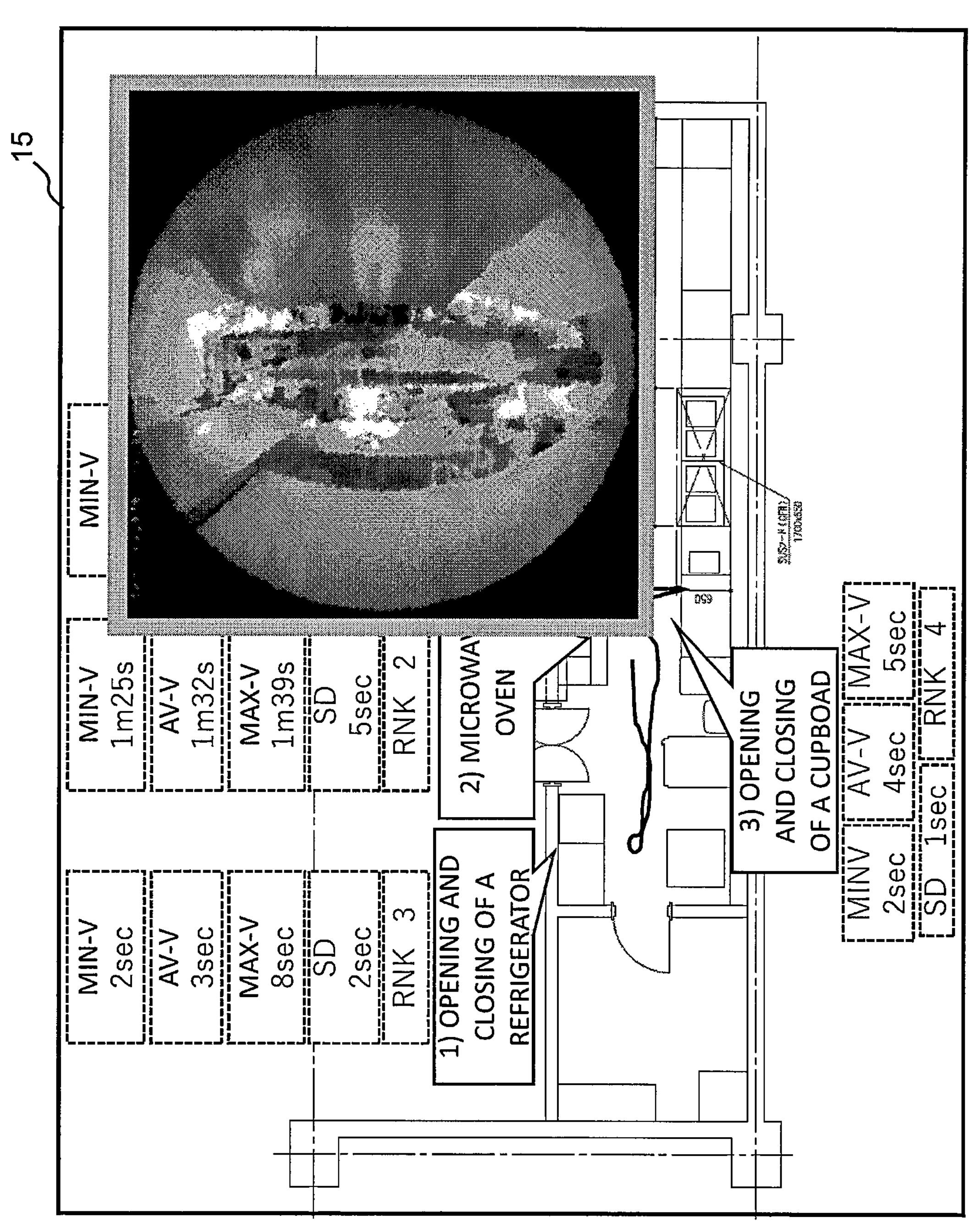
FIG. 13 is a diagram depicting camera video image display in the display of the operation sequence.
Figure 14:
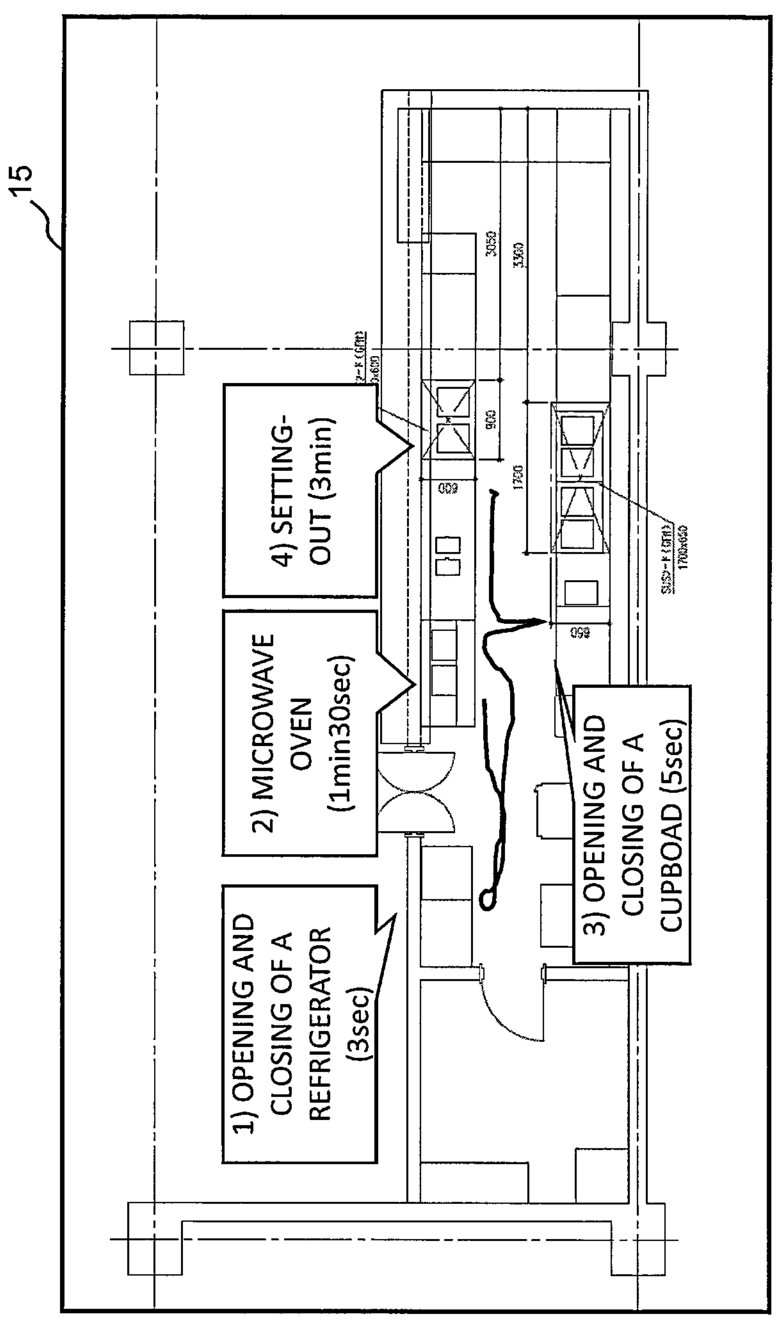
FIG. 14 a diagram depicting another example of the display of the operation sequence.

FIG. 12 to FIG. 14 depict display examples of the operation sequence by the display 15 based on the operation sequence information 56. The display example in FIG. 12 shows an operation sequence, that is, the order, the operation sites, and the operation contents of a series of individual operations, and the minimal value (MIN-V), the average value (AV-V), the maximal value (MAX-V), the standard deviation (SD), and the ranking (RNK) of operation time period necessary for each of the individual operations. The display example in FIG. 13 shows a camera video image. For example, during the display of the screen depicted in FIG. 12 by the display 15, when the user selects through the input unit 14 any of the individual operations from the displayed series of individual operations and the representative value (any of the minimal value, the average value, the maximal value, the standard deviation, and the ranking) of the operation time period of the individual operation, the camera video image of the individual operation corresponding to the selected representative value as depicted in FIG. 13 is displayed. The average value, the maximal value, or the standard deviation of the operation time period is settable as the ranking. The user can thereby check, for example, operations each taking a long time and individual operations each having a large dispersion in the operation time period in the ranking order using the corresponding camera video image. The display example in FIG. 14 shows the operation sequence, that is, the order, the operations sites, and the operation contents of the series of individual operations, and the operation time period necessary for each of the individual operations by a certain person.

3. Action of Operation Sequence Identification Device

3.1 Overall Action

Figure 15:
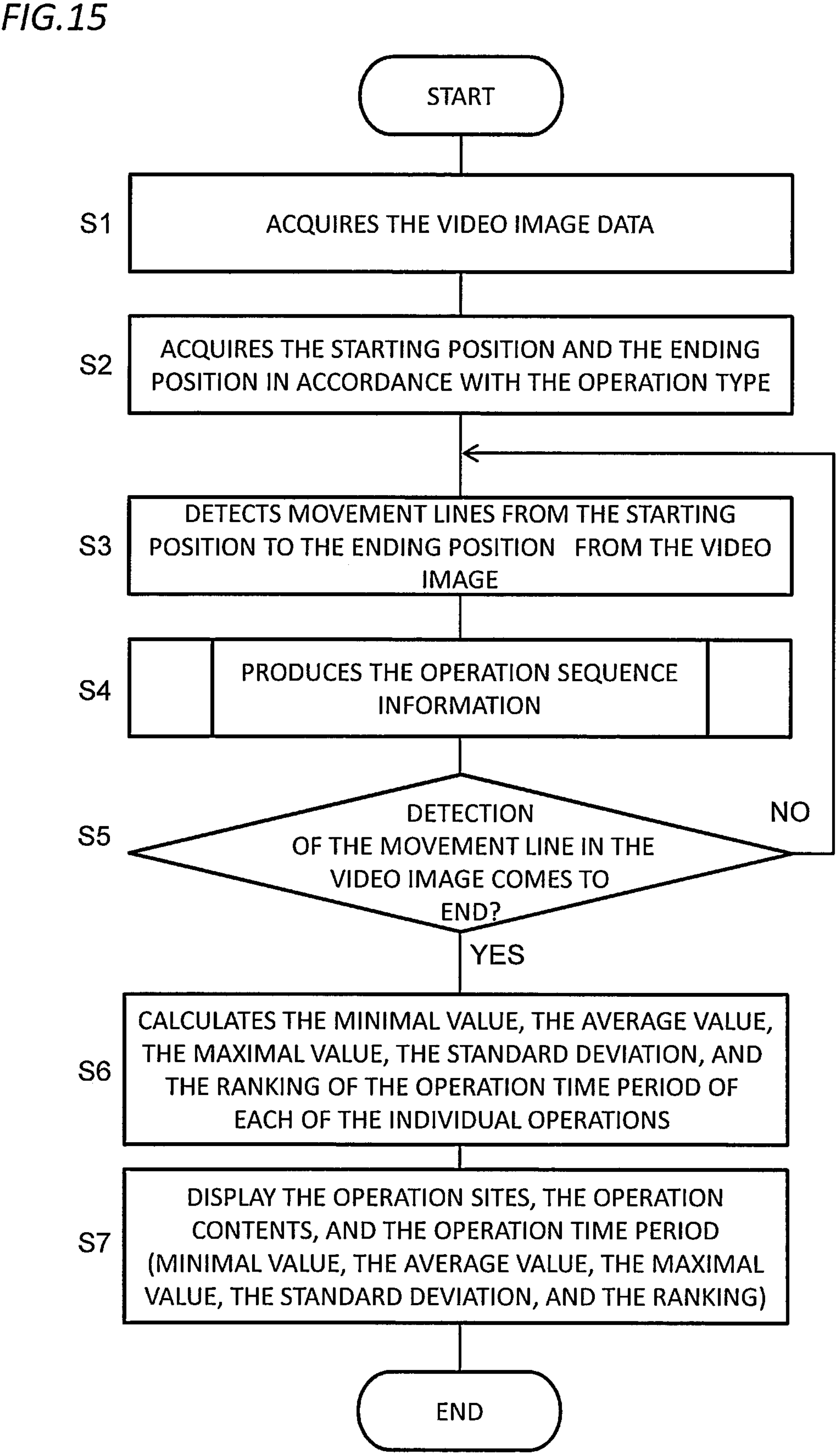
FIG. 15 is a flowchart for explaining an action of an operation sequence identification device of the first embodiment.

The action of the operation sequence identification device 1 having the above configuration will be described. FIG. 15 depicts the action of the control unit 12 of the operation sequence identification device 1 the above having configuration.

The control unit 12 acquires the video image data of the camera 2 (S1). For example, the operation sequence identification device 1 acquires the video image data produced by the camera 2 through the communication unit 11 and stores the video image data in the storage 13. At step S1, the control unit 12 reads the video image data stored in the storage 13. For example, the control unit 12 reads the video image data for one day.

The control unit 12 acquires the information on the starting position and the ending position in accordance with the operation type (S2). For example, when the operation type is designated by the user through the input unit 14, the control unit 12 reads from the start and end information 53 the starting position and the ending position in accordance with the operation type designated by the user.

The control unit 12 detects movement lines each from the starting position to the ending position from the video image data (S3). For example, the control unit 12 executes an image-analysis for the video image data to identify a moving person, and detects the movement line of the person from the starting position to the ending position to produce the movement line data 54.

The control unit 12 produces the operation sequence information 56 that indicates the series of individual operations on the movement line based on the movement line data 54 (S4).

The control unit 12 determines whether the detection of the movement line in the video image comes to an end (S5). For example, when any piece of data for which the identification of the person and the detection of the movement line at step S3 are not tried remains in the video image data acquired at step S1, the action returns to step S3. The control unit 12 thereby produces the operation sequence information 56, for example, for each of the movement lines detected at step S3. When the trial of the identification of the person and the detection of the movement lines comes to an end in the overall video image data acquired at step S1, the action advances to step S6.

The control unit 12 calculates the minimal value, the average value, the maximal value, the standard deviation, and the ranking of the operation time period of each of the individual operations based on the operation sequence information 56 produced at step S4 (S6). In this embodiment, the control unit 12 calculates all of the minimal value, the average value, the maximal value, the standard deviation, and the ranking while the control unit 12 may calculate any one or more thereof.

The control unit 12 causes the display 15 to display thereon the operation sites, the operation contents, and the operation time periods (S7). For example, as depicted in FIG. 12, the display 15 displays thereon the operation contents of the identified individual operations, the order of the individual operations, and the minimal value, the average value, the maximal value, the standard deviation, and the ranking of the operation time period of each of the individual operations, in the vicinity of the specified operation site. During the display of the screen depicted in FIG. 12 by the display 15, the control unit 12 may accept selection of any of the individual operations and the representative value (any of the minimal value, the average value, the maximal value, the standard deviation, and the ranking) of the operation time period by the user through the input unit 14. For example, the user may select the individual operation and the representative value of the operation time period using a touch panel. In this case, the control unit 12 may select the individual operation and the representative value of the operation time period in accordance with the selection by the user and, as depicted in FIG. 13, may cause the display 15 to display thereon the camera video image of the individual operation corresponding to the selected representative value. The control unit 12 may select any of the individual operations and the representative value of the operation time period not employing the selection by the user. For example, the control unit 12 may cause the display 15 to sequentially display thereon the camera video image corresponding to the minimal value, the average value, the maximal value, the standard deviation, or the ranking of each of the individual operations. Instead of or in addition to the aggregate display depicted in FIG. 12, the display 15 may display thereon the operation time periods by a certain person as depicted in FIG. 14. For example, in relation to the persons whose operation time periods of the overall operation sequence are maximal and minimal, the control unit 12 may cause the operation time period of each of the individual operations to be displayed together with the operation content and the order in the vicinity of the specified operation site.

3.2 Production Action of Operation Sequence Information

FIG. 16 depicts the details of the action of production of the operation sequence information 56, that is, step S4 in FIG. 15.

The control unit 12 specifies the operation site based on the movement line data 54 and the segmentation information 52 (S401). The control unit 12 selects the vicinity sensor 3 that detects the surrounding environment state at the specified operation site by referring to the sensor position information 51 (S402). The surrounding environment data 55 to be used in the identification of the operation content is thereby selected from the plural pieces of surrounding environment data 55 stored in the storage 13. In this embodiment, the control unit 12 selects all the vicinity sensors 3 present in a predetermined range from the specified operation site. In another example, the control unit 12 may select the vicinity sensor 3 closest to the movement line.

The control unit 12 acquires the surrounding environment data 55 produced by the selected vicinity sensor 3 from the storage 13 (S403).

The control unit 12 determines whether the vicinity sensors 3 selected at step S402 are two or more (S404).

When the vicinity sensors 3 selected at step S402 are two or more (YES at S404), the control unit 12 determines one vicinity sensor 3 from the two or more vicinity sensors 3 based on the surrounding environment data 55 acquired at step S403 (S405). For example, the control unit 12 correlates the movement line data 54 and the surrounding environment data 55 with each other based on the time-of-day information included in each thereof. The control unit 12 may select the vicinity sensor 3 whose detected value of the human detection sensor 31 at the time when a person is present at the operation site specified at step S401 indicates that the person is closer. The control unit 12 may select the vicinity sensor 3 whose detected value of the electromagnetic wave sensor 34 is greater. The control unit 12 may select the vicinity sensor 3 whose detected value of the sound sensor 32 is greater. The detected value to be referred to of the detected values d1 to dn included in the surrounding environment data 55 may be changed in accordance with the operation site.

When the vicinity sensor 3 selected at step S402 is one (NO at S404), step S405 is not executed and the action advances to step S406.

The control unit 12 identifies the operation content of the individual operation based on the surrounding environment data 55 produced by the determined one vicinity sensor 3 (S406). For example, the control unit 12 correlates the movement line data 54 and the surrounding environment data 55 with other based on the time-of-day information included in each thereof. The control unit 12 extracts from the surrounding environment data 55 the detected values d1 to dn of the duration during which a person is present at the operation site identified at step S401. The control unit 12 inputs into the individual operation identifier 120 the detected values d1 to dn for the predetermined time period of the detected values d1 to dn in the extracted time zone. For example, in the case where the detected values d1 to dn for one minute are extracted, the detected values d1 to dn for 10 seconds thereof may sequentially be input into the individual operation identifier 120. The control unit 12 may input the detected values d1 to dn for the predetermined time period from the time point at which a person enters into the range of the radius r representing the sensitivity of the vicinity sensor 3 into the individual operation identifier 120 based on the movement line data 54 and the sensor position information 51.

The control unit 12 calculates the operation time period necessary for the individual operation (S407). For example, the control unit 12 calculates the operation time period at the operation site specified at step S401 based on the time-of-day information included in the movement line data 54. The operation time period may be calculated based on the time-of-day information indicated by the surrounding environment data 55. For example, the control unit 12 may calculate the time period for which execution of each of identical individual operations is determined, based on the output result of the individual operation identifier 120 at step S406.

The control unit 12 adds the operation site specified at step S401, the operation content identified at step S406, and the operation time period calculated at step S407 to the operation sequence information 56 (step S408).

The control unit 12 sequentially executes steps S401 to S408 from the starting position of the movement line data 54. The control unit 12 determines whether the operation site specified at step S401 includes the ending position of the movement line and the movement line ends (S409). When the control unit 12 determines that the operation site specified at step S401 does not include the ending position, the action returns to step S401. Steps S401 to S408 are thereby executed at the next operation site of the movement line data 54. When the control unit 12 determines that the operation site specified at step S401 includes the ending position of the movement line and the movement line ends, the control unit 12 causes the operation sequence information production process depicted in FIG. 16 to come to an end.

4. Effects and Supplement

The operation sequence identification system 100 of this embodiment includes the operation sequence identification device 1, the camera 2, and the plural vicinity sensors 3. The camera 2 shoots the operation area and produces the video image data that indicates the position of the moving object in the operation area in chronological order. The plural vicinity sensors 3 are arranged at the positions different from each other in the operation area, and each produce the surrounding environment data 55 that indicates the surrounding environment state of the position of its disposition in chronological order. The surrounding environment state includes one or more of a sound, a vibration, an n infrared ray, an electromagnetic wave, geomagnetism, an acceleration, a temperature, humidity, illuminance, an atmospheric pressure, and a carbon dioxide concentration. The operation sequence identification device 1 identifies the operation sequence that includes the series of individual operations executed by the moving object based on the video image data and the surrounding environment data 55.

For example, the operation sequence identification device 1 includes the acquire unit and the control unit 12. The acquire unit is the communication unit 11 or the control unit 12. The acquire unit acquires the video image data and the surrounding environment data 55. The control unit 12 determines the order of the series of individual operations based on the video image data, identifies the operation content of each of the series of individual operations based on the surrounding environment data, and thereby identifies the operation sequence.

The movement line of a person can be detected from the video image data produced by the camera 2 disposed on the ceiling. It is however difficult to identify the operation content from this video image data. The operation content can be identified from the surrounding environment data 55 produced by the vicinity sensors 3. It is however difficult to identify the person and detect the movement line from this surrounding environment data 55. In this embodiment, the detection of the movement line of the person and the identification of the operation content can both be realized by using both of the video image data and the surrounding environment data 55. The operation sequence can therefore be highly precisely identified.

The acquire unit acquires the surrounding environment data 55 from each of the plural vicinity sensors 3 arranged at the positions different from each other in the operation area. The control unit 12 selects the surrounding environment data to be used in the identification of the operation content from the plural pieces of surrounding environment data 55 based on the position of the moving object and the positions of the plural vicinity sensors 3. In the case where the control unit 12 selects the plural pieces of surrounding environment data to be used in the identification of the operation content based on the position of the moving object and the positions of the plural vicinity sensors 3, the control unit 12 determines any one of the pieces of surrounding environment data to be actually used based on the selected plural pieces of surrounding environment data. The operation content can thereby be highly precisely identified.

The control unit 12 segments the operation area into the plural operation sites to manage the operation area, specifies the operation site at which the moving object is present from the plural operation sites based on the video image data, and produces the operation sequence information 56 by correlating the operation site and the operation content with each other. The production of the operation sequence information 56 can be automated and manual production of the operation sequence information 56 is therefore unnecessary. The operation sequence information 56 can therefore be efficiently produced. The operation sequence information 56 produced in this manner is useful for analyzing the operation to formulate improvements such as that of the instrument arrangement or the operation flow.

The control unit 12 detects the movement line of the moving object from the starting position to the ending position in accordance with the operation type in the operation area based on the video image data, and repeats the specification of the operation site and the identification of the operation content along the detected movement line to produce the operation sequence information 56. The operation sequence information 56 on the movement line in accordance with the operation type can thereby be produced.

The video image data includes the time-of-day information that indicates the time of day of the shooting, and the surrounding environment data 55 includes the time-of-day information that indicates the time of day of the sensing. The surrounding environment data 55 and the movement line data 54 produced from the video image data are synchronized with each other based on the time-of-day information. The control unit 12 calculates the operation time period based on the time-of-day information. Automatic measurement is thereby enabled for the operation time period necessary for each of the individual operations included in the operation sequence.

The control unit 12 calculates at least any one of the minimal value, the average value, the maximal value, the standard deviation, and the ranking of the operation time period necessary for each of identical individual operations. The calculated value is useful for analyzing the operation to formulate improvements such as that of instrument arrangement or the operation flow.

The operation sequence identification device 1 further includes the display 15 that displays the order, the operation sites, and the operation contents of the series of individual operations, and at least any one of the minimal value, the average value, the maximal value, the standard deviation, and the ranking of the time period necessary for each of the individual operations. The user can thereby visually check the operation sequence and the operation time period.

The operation area in this embodiment is an area in a kitchen and the series of individual operations includes operations relating to cooking. The operation sequence information 56 relating to the operations in the kitchen is useful for analyzing the operations in the kitchen to formulate improvements such as that of instrument arrangement or the operation flow.

Second Embodiment

In the first embodiment, at step S406, the control unit 12 identifies the operation content of the individual operation based on the surrounding environment data 55. In this embodiment, in addition to the surrounding environment data 55, the control unit 12 uses POS (Point of Sales) information indicating purchased merchandizes to identify the operation content of the individual operation.

Figure 17:
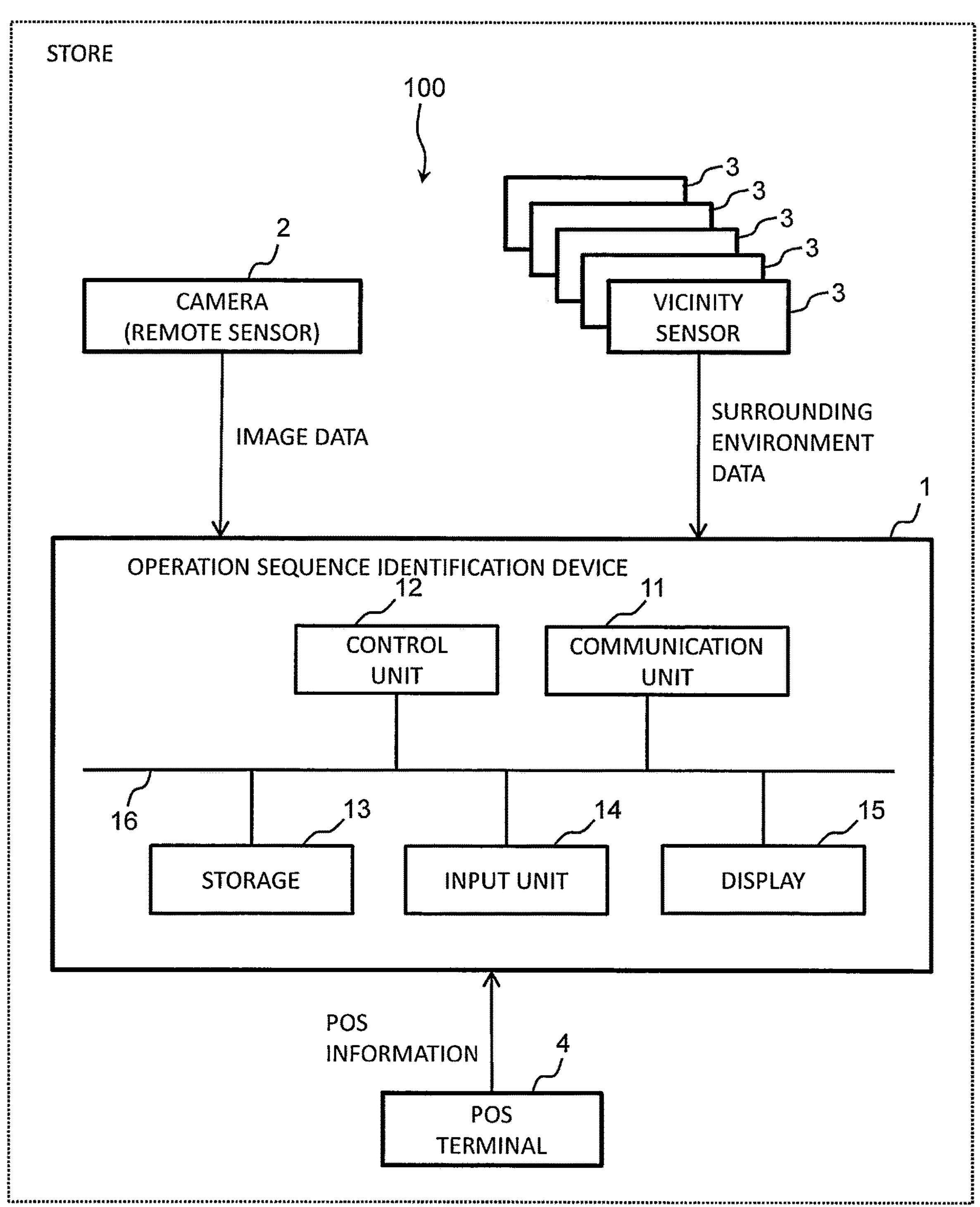
FIG. 17 is a block diagram depicting the configuration of an operation sequence identification system of a second embodiment.

FIG. 17 depicts the electric configuration of an operation sequence identification system 100 of this embodiment. The operation sequence identification system 100 of this embodiment further includes a POS terminal 4 in addition to the operation sequence identification device 1, the camera 2, and the plural vicinity sensors 3. The POS terminal 4 produces the POS information. The POS information includes the time of day, the merchandize name, the quantity, the amount of money, and the like at the time point of the sale. The operation sequence identification device 1 acquires the POS information produced by the POS terminal 4 through the communication unit 11. The communication unit 11 corresponds to the acquire unit that acquires the POS information from the POS terminal 4. The acquired POS information is stored in the storage 13. The control unit 12 corresponds to the acquire unit that reads the POS information from the storage 13.

Figure 18:
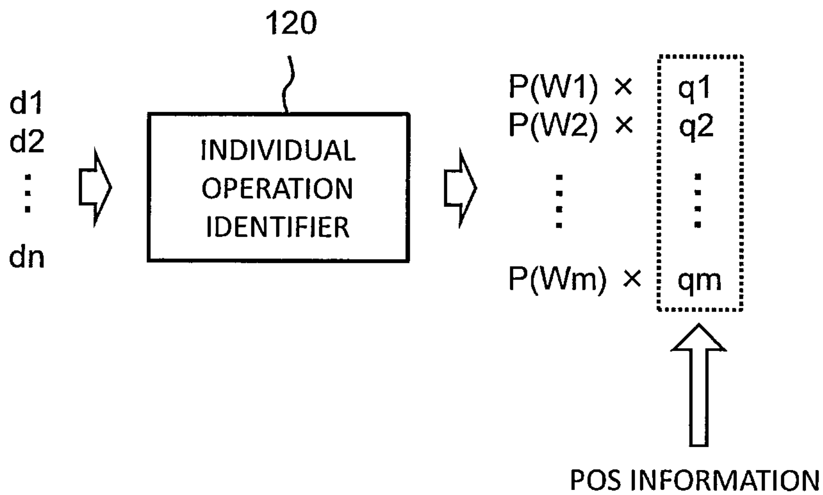
FIG. 18 is a diagram for explaining an example of identification of the operation content of an individual operation of the second embodiment.

FIG. 18 depicts an example of the identification of the operation content of the individual operation using the POS information of this embodiment. At step S406, the control unit 12 sets coefficients q1 to qm to be used in the identification of the operation content based on the purchased merchandize indicated by the POS information. For example, the coefficients q1 to qm respectively for the operation contents W1 to Wm are determined in advance for each merchandize, and information indicating the coefficients q1 to qm of each merchandize is stored in the storage 13. The control unit 12 reads the POS information from the storage 13 prior to step S406, and reads the coefficients q1 to qm corresponding to the purchased merchandise indicated by the POS information from the storage 13 at step S406. The control unit 12 multiplies the probabilities P(W1) to P(Wm) of the operation contents calculated by the individual operation identifier 120 respectively by the coefficients q1 to qm corresponding to the purchased merchandise. The control unit 12 calculates "P(W)×q" for the probability P(W) of each of the m individual operations output from the individual operation identifier 120. The control unit 12 determines that the operation content W whose calculated value of "P(W)×q" is maximal is the operation content of the individual operation corresponding to the detected values d1 to dn input into the individual operation identifier 120. The control unit 12 writes the operation content W to be the result of this identification executed in this manner into the operation sequence information 56.

As above, the acquire unit of this embodiment acquires the POS information: indicating the purchased merchandise in addition to the surrounding environment data 55. The control unit 12 identifies the operation content based on the POS information and the surrounding environment data 55. The operation content can thereby be highly precisely identified.

The operation content is determined by calculating the product of the probability P(W) and the coefficient q of each of the m individual operations output from the individual operation identifier 120 in this embodiment while the coefficient q may be learned in advance as the teacher data of the individual operation identifier 120. In this case, the detected value d and the coefficient q are input into the individual operation identifier 120, and it is determined that the operation content whose value is maximal of those of the probabilities P(W) to P(Wm) acquired from the output is the operation content corresponding to the input detected value d.

Third Embodiment

In the first and the second embodiments, the example has been described where the operation sequence identification system 100 identifies the operation sequence including the series of individual operations and produces the operation sequence information 56 indicating the operation sequence. In this embodiment, the operation sequence identification system 100 calculates the working rate of the moving object executing the series of individual operations. For example, the control unit 12 of the operation sequence identification device 1 calculates the working rate by calculating the time period during which the moving object does not work on the movement line.

Figure 19:
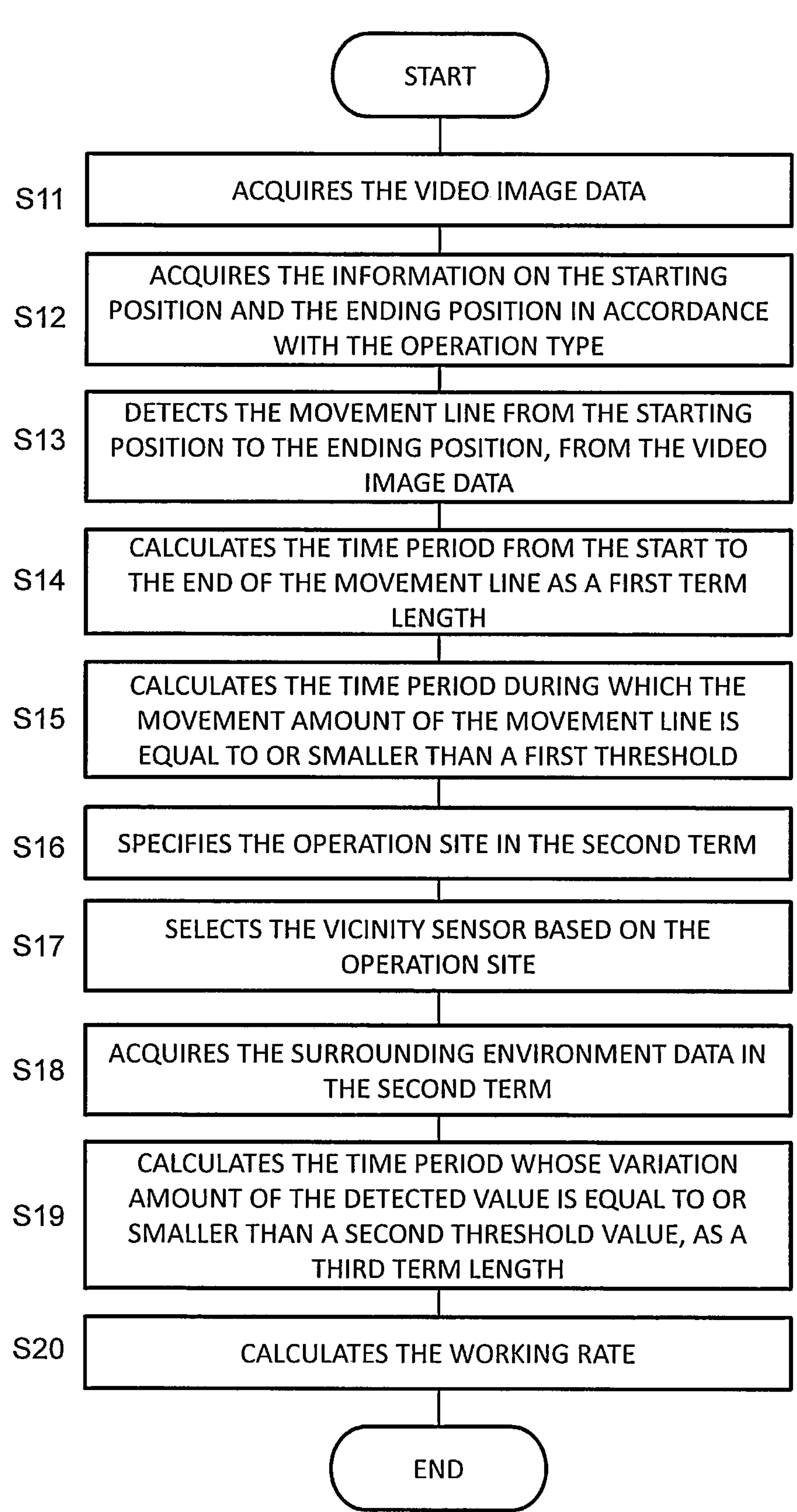
FIG. 19 is a flowchart for explaining calculation of a working rate of a third embodiment.

FIG. 19 is a flowchart depicting the action of the calculation of the working rate by the control unit 12 of the operation sequence identification device 1 of the third embodiment. The control unit 12 calculates the working rate depicted in FIG. 19 after, for example, the production of the operation sequence information 56 depicted in FIG. 15 and FIG. 16. The calculation of the working rate depicted in FIG. 19 may be executed in parallel with the production of the operation sequence information 56 depicted in FIG. 15 and FIG. 16. Steps S11 to S13 in FIG. 19 are identical to steps S1 to S3 in FIG. 15 of the first embodiment. Steps S16 to S18 in FIG. 19 correspond to steps S401 to S405 in FIG. 16 of the first embodiment.

The control unit 12 acquires the video image data of the camera 2 (S11). The control unit 12 acquires the information on the starting position and the ending position in accordance with the operation type (S12). The control unit 12 detects the movement line from the starting position to the ending position, from the video image data (S13).

The control unit 12 calculates the time period from the start to the end of the movement line as a first term length (S14). For example, the control unit 12 calculates the first term length based on the time-of-day information included in the movement line data 54.

The control unit 12 calculates the time period during which the movement amount of the movement line is equal to or smaller than a first threshold value between the starting position and the ending position of the movement line detected at step S13, as a second term length (S15). For example, the control unit 12 calculates the time period whose total value of the variation amounts of the x-coordinate and the y-coordinate is equal to or smaller than the first threshold value based on the movement line data 54, based on the time-of-day information included in the movement line data 54.

The control unit 12 specifies the operation site in the second term based on the movement line data 54 and the segmentation information 52 (S16). The control unit 12 refers to the sensor position information 51 to select the vicinity sensor 3 that detects the surrounding environment state at the specified operation site (S17). The control unit 12 acquires the surrounding environment data 55 in the second term produced by the vicinity sensor 3 from the storage 13 (S18). When the plural vicinity sensors 3 are selected at step S17, the control unit 12 determines one vicinity sensor 3 to be used in the identification of the operation content based on the surrounding environment data 55 produced by the selected vicinity sensors 3.

The control unit 12 calculates the time period whose variation amount of the detected value in the surrounding environment data 55 in the second term is equal to or smaller than a second threshold value, as a third term length (S19). For example, the control unit 12 calculates the time period whose detected value of an electromagnetic wave included in the surrounding environment data 55 in the second term is equal to or smaller than the second threshold value, based on the time-of-day information included in the surrounding environment data 55. The detected value to be used of the detected values d1 to dn included in the surrounding environment data 55 may be changed in accordance with the operation site specified at step S16. The control unit 12 may compare all the detected values d1 to dn included in the surrounding environment data 55 each with the corresponding second threshold value. When plural second terms between the starting position and the ending position of the movement line are calculated at step S15, the control unit 12 executes the processes described at steps S16 to S19 for each of the second terms to calculate the third term length of each thereof.

The third term is a time period during which the movement amount of the movement line is equal to or smaller than the first threshold value and during which the variation amount of the detected value in the surrounding environment data 55 is equal to or smaller than the second threshold value. The third term represents a non-working time period of the moving object.

The control unit 12 calculates the working rate (S20). For example, the control unit 12 calculates the working rate by "the working rate=(the first term−the total of the third terms)/the first term". The control unit 12 may calculate the non-working rate by "the non-working rate=the total of the third terms/the first term".

The control unit 12 may add the calculated working rate to the operation sequence information 56, or may display the calculated working rate on the display 15. The control unit 12 may add the non-working time period to be the third term length to the operation sequence information 56, or may display the non-working time period on the display 15. For example, the control unit 12 may correlate the operation site specified at step S16 and the non-working time period with each other to add these to the operation sequence information 56. The display 15 may display thereon the non-working time period in the vicinity of the operation site.

As above, the control unit 12 calculates the working rate of the moving object based on the ratio of the time period during which the variation amount of the position of the moving object on the detected movement line is equal to or smaller than the first threshold value and during which the variation amount of the surrounding environment state is equal to or smaller than the second threshold value, in the overall time period of the movement line. The data indicating the working rate is useful for analyzing the operation to formulate improvements such as that of the instrument arrangement or the operation flow.

Other Embodiments

The first embodiment to the third embodiment have been described as above as exemplification of the technique disclosed in this application. The technique of this disclosure is however not limited thereto and is also applicable to embodiments to which changes, replacements, additions, omissions, and the like are appropriately made. Other embodiments will therefore be exemplified below.

The example where the operation sequence including the series of individual operations executed by the person present in the kitchen is identified has been described in the first embodiment to the third embodiment while the object of the identification of the operation sequence is not limited to the operations executed by the person in the kitchen. For example, the object of the identification of the operation sequence is not limited to the operations in the kitchen and may be operations in a plant. The object of the identification of the operation sequence is not limited to the operations executed by a person and may be operations executed by a machine such as a forklift or a robot. The operation sequence identification device 1, the camera 2, and the plural vicinity sensors 3 may be arranged in the plant. The camera 2 may shoot the range having the forklift moving therein in the plant. The operation sequence identification device 1 may detect the motions of the forklift using the vicinity sensors 3. The vicinity sensors 3 are usable for detecting human motions, machine motions, and the on-site environment. The human motions include, for example, assembling a product, picking, and cooking for a lunch box. The machine motions include line motions, forklift motions, and the situation of cooking utensils. The on-site environment includes a noise, a temperature, humidity, a carbon dioxide concentration, illuminance, and the like.

The example where the operation sequence including the series of individual operations in the kitchen in the store has been described in the first embodiment to the third embodiment. The application object thereof is however not only the commercial use such as a store and may be operations in a kitchen or a room in a home. For example, in the case of a kitchen in a home, the operation sequence identification device 1, the camera 2, and the plural vicinity sensors 3 may be arranged in the kitchen. The vicinity sensors 3 are usable for detecting motions of a cook, motions of cooking utensils, and the kitchen environment. The motions of the cook include taking out and putting in food, cooking food, and taking out and putting in eating utensils. The motions of the cooking utensils include opening and closing a cupboard, the state of the cooking utensils, and opening and closing a storage rack. The kitchen environment includes a noise, a temperature, humidity, a carbon dioxide concentration, illuminance, and the like. The operation sequence of the cooking operations in the kitchen is thereby identified.

The camera 2 is used as an example of the remote sensor in the above embodiments while the remote sensor is not limited to the camera 2. The remote sensor only has to be a sensor capable of detecting the position of the moving object. The operation sequence identification device 1 produces the movement line data 54 by image-analyzing the video image data in the above embodiments while the operation sequence identification device 1 may acquire the movement line data 54 from another instrument that includes the camera 2 or another remote sensor that detects the position of the moving object.

The starting position and the ending position in accordance with the operation type are detected from the start and end information 53 in the above embodiments while the starting position and the ending position may be detected from the video image data of the camera 2. For example, using the movement line position and action difference information acquired from the camera 2, in the case where the movement line is included in a specific range and the action difference information is equal to or larger than a threshold value determined in advance, the position is detected as the starting position or the ending position of the operation. This is useful for the case where the starting and/or the ending of the operation are/is executed at a position(s) other than the ordinarily assumed position(s). For example, when a dish is served, the employee stretches a hand thereof and the action difference value at this time therefore provides a great value. Even a site around the counter other than the ordinary dish service position can therefore be detected as the operation ending position when the action difference value is equal to or greater than the threshold value.

Overview of Embodiments (1) The operation sequence identification device of this disclosure is an operation sequence identification device that identifies an operation sequence including a series of individual operations, and includes an acquire unit that acquires first sensing information indicating the position of a moving object in an operation area in chronological order and plural pieces of second sensing information indicating surrounding environment states at different positions in an operation area in chronological order, and a control unit that specifies the order of the series of individual operations based on the first sensing information and that identifies the operation content of each of the series of individual operations based on the second sensing information.

The operation sequence can thereby be highly precisely identified.

(2) In the operation sequence identification device of (1), the acquire unit may acquire the second sensing information from each of the plural vicinity sensors arranged at different positions in the operation area and the control unit may select the second sensing information to be used in the identification of the operation content from the plural pieces of second sensing information based on the position of the moving object indicated by the first sensing information and the positions of the plural vicinity sensors.

The operation content of each of the individual operations can thereby be highly precisely identified.

(3) In the operation sequence identification device of (2), in the case where the control unit selects plural pieces of second sensing information to be used in the identification of the operation content based on the position of the moving object and the positions of the plural vicinity sensors, the control unit may determine any one piece of second sensing information to be actually used based on the selected plural pieces of second sensing information.

The operation content of each of the individual operations can thereby be highly precisely identified.

(4) In the operation sequence identification device of (1), the control unit may segment the operation area into plural operation sites to manage the operation area, may specify the operation site at which the moving object is present from the plural operation sites based on the first sensing information, and may correlate the operation site and the operation content with each other to produce operation sequence information indicating the operation sequence.

This operation sequence information is useful for analyzing the operation to formulate improvements such as that of the instrument arrangement or the operation flow.

(5) In the operation sequence identification device of (4), the control unit may detect the movement line of the moving object from a first predetermined position to a second predetermined position in the operation area based on the first sensing information and may repeat the specification of the operation site and the identification of the operation content along the detected movement line to produce the operation sequence information.

The operation sequence information on the movement line in accordance with the operation type can be produced by setting the first predetermined position and the second predetermined position in accordance with the operation type.

(6) In the operation sequence identification device of (5), the first sensing information and the second sensing information may each include time-of-day information that indicates the time of day of the sensing, and the control unit may correlate the first sensing information and the second sensing information with each other based on the pieces of time-of-day information.

The order of the individual operations and their operation contents can thereby be highly precisely identified.

(7) In the operation sequence identification device of (6), the control unit may measure the time period necessary for each of the individual operations based on the time-of-day information.

The measured time period is useful for analyzing the operation to formulate improvements such as that of the instrument arrangement or the operation flow.

(8) In the operation sequence identification device of (7), the control unit may calculate at least any one of the minimal value, the average value, the maximal value, the standard deviation, and the ranking of the time periods necessary for each of identical individual operations.

The calculated minimal value, average value, maximal value, standard deviation, and ranking are useful for analyzing the operation to formulate improvements such as that of the instrument arrangement or the operation flow.

(9) In the operation sequence identification device of (6), the control unit may calculate the working rate of the moving object based on the ratio of the time period during which the variation amount of the position of the moving object on the detected movement line is equal to or smaller than a first threshold value and during which the variation amount of the surrounding environment state is equal to or smaller than a second threshold value, in the overall time period of the movement line.

The working rate is useful for analyzing the operation to formulate improvements such as that of the instrument arrangement or the operation flow.

(10) The operation sequence identification device of (1) may further include a display that displays thereon the order, the operation sites, and the operation contents of the series of individual operations and at least any one of the minimal value, the average value, the maximal value, the standard deviation, and the ranking of the time period necessary for each of the individual operations.

The user can thereby visually check the operation sequence.

(11) In the operation sequence identification device of (1), the acquire unit may acquire POS information that indicates a purchased merchandise and the control unit may identify the operation content based on the POS information and the second sensing information.

The operation content of the individual operation can thereby be highly precisely identified.

(12) In the operation sequence identification device of (1), the acquire unit may acquire video image data produced by a camera that shoots the operation area as the first sensing information.

(13) In the operation sequence identification device of (1), the surrounding environment state indicated by the second sensing information may include one or more of a sound, a vibration, an infrared ray, an electromagnetic wave, geomagnetism, an acceleration, a temperature, humidity, illuminance, an atmospheric pressure, and a carbon dioxide concentration.

(14) In the operation sequence identification device of (1), the operation area may be an area in a kitchen and the series of individual operations may include operations relating to cooking.

(15) The operation sequence identification system of this disclosure includes a camera that shoots an operation area to produce first sensing information indicating the position of a moving object in the operation area in chronological order, plural vicinity sensors that are arranged at different positions in the operation area to each produce second sensing information indicating the surrounding environment state of the position at which the vicinity sensor is arranged in chronological order, and the operation sequence identification device of (1) that identifies the operation sequence including a series of individual operations executed by the moving object based on the first sensing information and the plural pieces of second sensing information.

(16) An operation sequence identification method of this disclosure is an operation sequence identification method of identifying an operation sequence including a series of individual operations by a computing unit, and includes the steps of (a) acquiring first sensing information that indicates the position of a moving object in an operation area in chronological order and plural pieces of second sensing information that each indicate the surrounding environment state at each of different positions in the operation area, and (b) specifying the order of the series of individual operations based on the first sensing information and identifying the operation content of each of the series of individual operations based on the second sensing information.

(17) The operation sequence identification method of (16) may further include the steps of (c) displaying the order, the operation sites, and the operation contents of the series of individual operations, and at least any one of the minimal value, the average value, the maximal value, the standard deviation, and the ranking of the time period necessary for each of the individual operations.

(18) In the operation sequence identification method of (17), the step (c) may include selecting any individual operation from the series of individual operations, selecting any of the minimal value, the average value, the maximal value, the standard deviation, and the ranking of the time period necessary for the selected individual operation as a representative value, and displaying a video image of the individual operation corresponding the to selected representative value.

(19) A non-transitory computer-readable recording medium of this disclosure cases a computer to execute the operation sequence identification method of (16).

The operation sequence identification device, the operation sequence identification system, and the operation sequence identification method according to all the claims of this disclosure are each realized by cooperation of hardware resources such as, for example, a processor and a memory, and a computer program with each other, or the like.

The operation sequence identification device and the operation sequence identification system of this disclosure are useful as devices each automatically identifying an operation sequence that includes a series of individual operations.

What is claimed is:

1. An analyze device that analyses an act of a person who purchase one or more products comprising:

a communication circuit that acquires sensing information indicating a position of the person who purchases the one or more products in a store area in chronological order and POS information; and a control circuit that specifies a movement of the person based on the sensing information and identifies the one or more products being purchased based on the POS information, wherein the control circuit specifies the act of the person who purchase the one or more products based on the movement information and the POS information, wherein the sensing information and the POS information each comprise time-of-day information, and wherein the control circuit correlates the sensing information and the POS information with each other based on the time-of-day information.

2. The analyze device according to claim 1, wherein the control circuit formulates an improvement in response to the specified act.

3. The analyze device according to claim 1, wherein the control circuit measures a time period which a movement amount of the movement is equal to or smaller than a threshold value.

4. The analyze device according to claim 1, wherein the control circuit:

segments the store area into a plurality of sites and manages the store area, specifies the site at which the person is present from the plurality of sites based on the movement information and the segmentation information, and produces sequence information indicating a sequence of the act the person based on the site and the POS information.

5. The analyze device according to claim 1, wherein the control circuit inputs the specified acts into learning model as training data.

6. The analyze device according to claim 1, further comprising a display that displays the sequence of the act, the site of the person and the one or more products being purchased, and at least any one of a minimal value, an average value, and a maximal value of a time period necessary for each of the individual acts.

7. The analyze device according to claim 1, wherein the communication circuit acquires video image data produced by a camera that shoots the store area, as the sensing information.

8. The analyze device according to claim 1, wherein the control circuit measures a time period necessary for each of the individual act based on the time-of-day information.

9. The analyze device according to claim 8, wherein the control circuit calculates at least any one of a minimal value, an average value, a maximal value, a standard deviation, and a ranking of a time period necessary for each of acts.

10. A non-transitory computer-readable recording medium storing a computer program causing a control circuit included in an analyze device to execute:

acquiring sensing information indicating a position of the a who purchases one or more products in a store area in chronological order and POS information, wherein the sensing information and the POS information each comprise time-of-day information, and specifying a movement of the person based on the sensing information and identifies the one or more products being purchased based on the POS information, specifying an act of the person who purchase the one or more products based on the movement information and the POS information, and correlating the sensing information and the POS information with each other based on the time-of-day information.

* * * * *